United States Patent
Yu et al.

(10) Patent No.: US 12,170,552 B2
(45) Date of Patent: Dec. 17, 2024

(54) PRECODING MATRIX DETERMINING METHOD AND APPARATUS

(71) Applicant: HUAWEI TECHNOLOGIES CO., LTD., Shenzhen (CN)

(72) Inventors: Jian Yu, Beijing (CN); Zhiheng Guo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 160 days.

(21) Appl. No.: 18/146,519

(22) Filed: Dec. 27, 2022

(65) Prior Publication Data

US 2023/0170952 A1 Jun. 1, 2023

Related U.S. Application Data

(63) Continuation of application No. PCT/CN2021/103275, filed on Jun. 29, 2021.

(30) Foreign Application Priority Data

Jun. 29, 2020 (CN) .......................... 202010605251.8

(51) Int. Cl.
*H04B 7/0456* (2017.01)

(52) U.S. Cl.
CPC .................. *H04B 7/0456* (2013.01)

(58) Field of Classification Search
CPC ... H04B 7/0478; H04B 7/0456; H04B 7/0639
See application file for complete search history.

(56) References Cited

U.S. PATENT DOCUMENTS

| 10,680,686 | B2 | 6/2020 | Ko et al. |
| 2019/0334594 | A1 | 10/2019 | Jin et al. |
| 2020/0044700 | A1 | 2/2020 | Wang et al. |
| 2020/0052748 | A1 | 2/2020 | Kim et al. |
| 2021/0105724 | A1* | 4/2021 | Huang ................ H04W 52/365 |

(Continued)

FOREIGN PATENT DOCUMENTS

| CN | 103795450 A | 5/2014 |
| CN | 107646173 A | 1/2018 |
| CN | 107911151 A | 4/2018 |

(Continued)

OTHER PUBLICATIONS

Chinese Notice of Allowance issued in corresponding Chinese Application No. 202010605251.8, dated Jun. 29, 2023, pp. 1-5.

(Continued)

*Primary Examiner* — Aristocratis Fotakis
(74) *Attorney, Agent, or Firm* — HAUPTMAN HAM, LLP

(57) ABSTRACT

This application discloses a precoding matrix determining method and an apparatus. The method includes: A terminal device receives first precoding indication information from a network device; and the terminal device determines, from a first codebook set, a first precoding matrix indicated by the first precoding indication information, where the first codebook set includes the first precoding matrix, a second precoding matrix, and a third precoding matrix, an element at a first position in the first precoding matrix is equal to a value of exponentiation with a first value as an exponent and a natural constant as a base.

20 Claims, 9 Drawing Sheets

| TPMI index | Precoding matrix | | | |
|---|---|---|---|---|
| 0 to 3 | $\frac{1}{\sqrt{2}}\begin{bmatrix}1\\e^{j\cdot 0}\end{bmatrix}$ | $\frac{1}{\sqrt{2}}\begin{bmatrix}1\\e^{j\cdot\frac{\pi}{4}}\end{bmatrix}$ | $\frac{1}{\sqrt{2}}\begin{bmatrix}1\\e^{j\cdot\frac{\pi}{2}}\end{bmatrix}$ | $\frac{1}{\sqrt{2}}\begin{bmatrix}1\\e^{j\cdot\frac{3\pi}{4}}\end{bmatrix}$ |
| 4 to 7 | $\frac{1}{\sqrt{2}}\begin{bmatrix}1\\e^{j\cdot\pi}\end{bmatrix}$ | $\frac{1}{\sqrt{2}}\begin{bmatrix}1\\e^{j\cdot\frac{5\pi}{8}}\end{bmatrix}$ | $\frac{1}{\sqrt{2}}\begin{bmatrix}1\\e^{j\cdot\frac{6\pi}{8}}\end{bmatrix}$ | $\frac{1}{\sqrt{2}}\begin{bmatrix}1\\e^{j\cdot\frac{7\pi}{8}}\end{bmatrix}$ |

(56) References Cited

U.S. PATENT DOCUMENTS

| | | | | |
|---|---|---|---|---|
| 2021/0345253 | A1* | 11/2021 | Matsumura | H04B 7/0404 |
| 2023/0008524 | A1* | 1/2023 | Okamura | H04L 5/0048 |

FOREIGN PATENT DOCUMENTS

| | | |
|---|---|---|
| CN | 108029126 A | 5/2018 |
| CN | 109787668 A | 5/2019 |
| CN | 109803419 A | 5/2019 |
| CN | 110166087 A | 8/2019 |
| CN | 110601733 A | 12/2019 |
| CN | 111034063 A | 4/2020 |
| CN | 111211822 A | 5/2020 |
| EP | 3751768 A1 | 12/2020 |
| KR | 20070114064 A | 11/2007 |
| WO | 2014067460 A1 | 5/2014 |
| WO | 2017049524 A1 | 3/2017 |
| WO | 2018228599 A1 | 12/2018 |
| WO | 2019114690 A1 | 6/2019 |
| WO | 2019157757 A1 | 8/2019 |

OTHER PUBLICATIONS

Extended European Search Report issued in corresponding European Application No. 21833956.2, dated Nov. 6, 2023, pp. 1-7.

3GPP TS 38.211 V16.1.0 (Mar. 2020), 3rd Generation Partnership Project; Technical Specification Group Radio Access Network; NR; Physical channels and modulation(Release 16), 130 pages.

3GPP TS 38.212 V16.1.0 (Mar. 2020), 3rd Generation Partnership Project; Technical Specification Group Radio Access Network; NR; Multiplexing and channel coding(Release 16), 146 pages.

International Search Report issued in corresponding International Application No. PCT/CN2021/103275, dated Sep. 18, 2021, pp. 1-11.

Chinese Office Action issued in corresponding Chinese Application No. 202010605251.8, dated Dec. 14, 2022, pp. 1-7.

* cited by examiner

| TPMI index | Precoding matrix | | | | | | | |
|---|---|---|---|---|---|---|---|---|
| 0 to 7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8 to 15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ |
| 16 to 23 | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ |
| 24 to 27 | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ | - | - | - | - |

FIG. 4

```
                                                  501
┌─────────────────────────────────────────────────────┐
│  A terminal device receives first precoding indication information from a  │
│                        network device                │
└─────────────────────────────────────────────────────┘
                           │
                           ▼                      502
┌─────────────────────────────────────────────────────┐
│ The terminal device determines, from a first codebook set, a first precoding │
│    matrix indicated by the first precoding indication information   │
└─────────────────────────────────────────────────────┘
```

FIG. 5

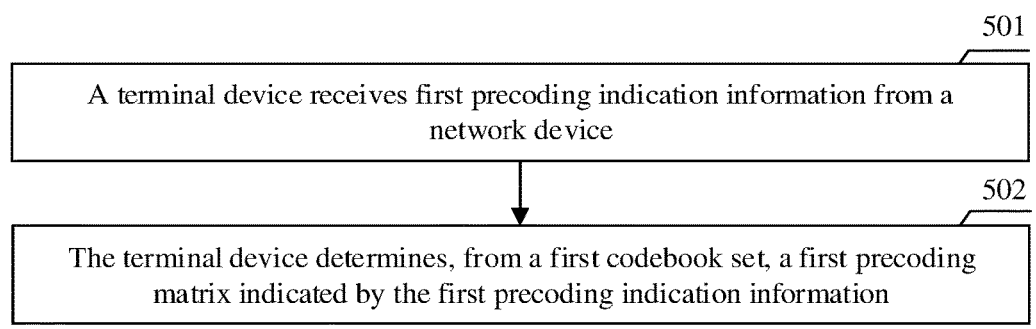

FIG. 6

| TPMI index | Precoding matrix | | | |
|---|---|---|---|---|
| 0 to 3 | $\frac{1}{2}\begin{bmatrix}1\\1\end{bmatrix}\begin{bmatrix}1\\e^{j\cdot 0}\end{bmatrix}$ | $\frac{1}{2}\begin{bmatrix}1\\e^{j\frac{\pi}{4}}\end{bmatrix}\begin{bmatrix}1\\e^{j\frac{\pi}{4}}\end{bmatrix}$ | $\frac{1}{2}\begin{bmatrix}1\\e^{j\frac{\pi}{2}}\end{bmatrix}\begin{bmatrix}1\\e^{j\frac{\pi}{2}}\end{bmatrix}$ | $\frac{1}{2}\begin{bmatrix}1\\e^{j\frac{3\pi}{4}}\end{bmatrix}\begin{bmatrix}1\\e^{j\frac{3\pi}{4}}\end{bmatrix}$ |
| 4 to 7 | $\frac{1}{2}\begin{bmatrix}1\\e^{j\pi}\end{bmatrix}\begin{bmatrix}1\\-e^{j\pi}\end{bmatrix}$ | $\frac{1}{2}\begin{bmatrix}1\\e^{j\frac{5\pi}{8}}\end{bmatrix}\begin{bmatrix}1\\e^{j\frac{5\pi}{8}}\end{bmatrix}$ | $\frac{1}{2}\begin{bmatrix}1\\e^{j\frac{6\pi}{8}}\end{bmatrix}\begin{bmatrix}1\\e^{j\frac{6\pi}{8}}\end{bmatrix}$ | $\frac{1}{2}\begin{bmatrix}1\\e^{j\frac{7\pi}{8}}\end{bmatrix}\begin{bmatrix}1\\e^{j\frac{7\pi}{8}}\end{bmatrix}$ |

FIG. 7

| TPMI index | Precoding matrix | | | |
|---|---|---|---|---|
| 0 to 3 | $\frac{1}{2}\left[\begin{bmatrix}1\\e^{j\cdot 0}\end{bmatrix}\begin{bmatrix}1\\e^{j\cdot 0}\end{bmatrix}e^{j\cdot 0}\right]$ | $\frac{1}{2}\left[\begin{bmatrix}1\\e^{j\frac{\pi}{4}}\end{bmatrix}\begin{bmatrix}1\\e^{j\frac{\pi}{4}}\end{bmatrix}e^{j\cdot 0}\right]$ | $\frac{1}{2}\left[\begin{bmatrix}1\\e^{j\frac{\pi}{2}}\end{bmatrix}\begin{bmatrix}1\\e^{j\frac{\pi}{2}}\end{bmatrix}e^{j\cdot 0}\right]$ | $\frac{1}{2}\left[\begin{bmatrix}1\\e^{j\frac{3\pi}{4}}\end{bmatrix}\begin{bmatrix}1\\e^{j\frac{3\pi}{4}}\end{bmatrix}e^{j\cdot 0}\right]$ |
| 4 to 7 | $\frac{1}{2}\left[\begin{bmatrix}1\\e^{j\cdot\pi}\end{bmatrix}\begin{bmatrix}1\\e^{j\cdot\pi}\end{bmatrix}e^{j\cdot 0}\right]$ | $\frac{1}{2}\left[\begin{bmatrix}1\\e^{j\frac{5\pi}{8}}\end{bmatrix}\begin{bmatrix}1\\e^{j\frac{5\pi}{8}}\end{bmatrix}e^{j\cdot 0}\right]$ | $\frac{1}{2}\left[\begin{bmatrix}1\\e^{j\frac{6\pi}{8}}\end{bmatrix}\begin{bmatrix}1\\e^{j\frac{6\pi}{8}}\end{bmatrix}e^{j\cdot 0}\right]$ | $\frac{1}{2}\left[\begin{bmatrix}1\\e^{j\frac{7\pi}{8}}\end{bmatrix}\begin{bmatrix}1\\e^{j\frac{7\pi}{8}}\end{bmatrix}e^{j\cdot 0}\right]$ |
| 8 to 11 | $\frac{1}{2}\left[\begin{bmatrix}1\\e^{j\cdot 0}\end{bmatrix}\begin{bmatrix}1\\e^{j\cdot 0}\end{bmatrix}e^{j\frac{\pi}{2}}\right]$ | $\frac{1}{2}\left[\begin{bmatrix}1\\e^{j\frac{\pi}{4}}\end{bmatrix}\begin{bmatrix}1\\e^{j\frac{\pi}{4}}\end{bmatrix}e^{j\frac{\pi}{2}}\right]$ | $\frac{1}{2}\left[\begin{bmatrix}1\\e^{j\frac{\pi}{2}}\end{bmatrix}\begin{bmatrix}1\\e^{j\frac{\pi}{2}}\end{bmatrix}e^{j\frac{\pi}{2}}\right]$ | $\frac{1}{2}\left[\begin{bmatrix}1\\e^{j\frac{3\pi}{4}}\end{bmatrix}\begin{bmatrix}1\\e^{j\frac{3\pi}{4}}\end{bmatrix}e^{j\frac{\pi}{2}}\right]$ |
| 12 to 15 | $\frac{1}{2}\left[\begin{bmatrix}1\\e^{j\cdot\pi}\end{bmatrix}\begin{bmatrix}1\\e^{j\cdot\pi}\end{bmatrix}e^{j\frac{\pi}{2}}\right]$ | $\frac{1}{2}\left[\begin{bmatrix}1\\e^{j\frac{5\pi}{8}}\end{bmatrix}\begin{bmatrix}1\\e^{j\frac{5\pi}{8}}\end{bmatrix}e^{j\frac{\pi}{2}}\right]$ | $\frac{1}{2}\left[\begin{bmatrix}1\\e^{j\frac{6\pi}{8}}\end{bmatrix}\begin{bmatrix}1\\e^{j\frac{6\pi}{8}}\end{bmatrix}e^{j\frac{\pi}{2}}\right]$ | $\frac{1}{2}\left[\begin{bmatrix}1\\e^{j\frac{7\pi}{8}}\end{bmatrix}\begin{bmatrix}1\\e^{j\frac{7\pi}{8}}\end{bmatrix}e^{j\frac{\pi}{2}}\right]$ |

FIG. 8A

| TPMI index | Precoding matrix | | | |
|---|---|---|---|---|
| 16 to 19 | $\frac{1}{2}\begin{bmatrix}\begin{bmatrix}1\\e^{j\cdot 0}\end{bmatrix}\\\begin{bmatrix}1\\e^{j\cdot 0}\end{bmatrix}e^{j\pi}\end{bmatrix}$ | $\frac{1}{2}\begin{bmatrix}\begin{bmatrix}1\\e^{j\cdot\frac{\pi}{4}}\end{bmatrix}\\\begin{bmatrix}1\\e^{j\cdot\frac{\pi}{4}}\end{bmatrix}e^{j\cdot\pi}\end{bmatrix}$ | $\frac{1}{2}\begin{bmatrix}\begin{bmatrix}1\\e^{j\cdot\frac{\pi}{2}}\end{bmatrix}\\\begin{bmatrix}1\\e^{j\cdot\frac{\pi}{2}}\end{bmatrix}e^{j\cdot\pi}\end{bmatrix}$ | $\frac{1}{2}\begin{bmatrix}\begin{bmatrix}1\\e^{j\cdot\frac{3\pi}{4}}\end{bmatrix}\\\begin{bmatrix}1\\e^{j\cdot\frac{3\pi}{4}}\end{bmatrix}e^{j\cdot\pi}\end{bmatrix}$ |
| 20 to 23 | $\frac{1}{2}\begin{bmatrix}\begin{bmatrix}1\\e^{j\cdot\pi}\end{bmatrix}\\\begin{bmatrix}1\\e^{j\cdot\pi}\end{bmatrix}e^{j\cdot\pi}\end{bmatrix}$ | $\frac{1}{2}\begin{bmatrix}\begin{bmatrix}1\\e^{j\cdot\frac{5\pi}{8}}\end{bmatrix}\\\begin{bmatrix}1\\e^{j\cdot\frac{5\pi}{8}}\end{bmatrix}e^{j\cdot\pi}\end{bmatrix}$ | $\frac{1}{2}\begin{bmatrix}\begin{bmatrix}1\\e^{j\cdot\frac{6\pi}{8}}\end{bmatrix}\\\begin{bmatrix}1\\e^{j\cdot\frac{6\pi}{8}}\end{bmatrix}e^{j\cdot\pi}\end{bmatrix}$ | $\frac{1}{2}\begin{bmatrix}\begin{bmatrix}1\\e^{j\cdot\frac{7\pi}{8}}\end{bmatrix}\\\begin{bmatrix}1\\e^{j\cdot\frac{7\pi}{8}}\end{bmatrix}e^{j\cdot\pi}\end{bmatrix}$ |
| 24 to 27 | $\frac{1}{2}\begin{bmatrix}\begin{bmatrix}1\\e^{j\cdot 0}\end{bmatrix}\\\begin{bmatrix}1\\e^{j\cdot 0}\end{bmatrix}e^{j\cdot\frac{3\pi}{2}}\end{bmatrix}$ | $\frac{1}{2}\begin{bmatrix}\begin{bmatrix}1\\e^{j\cdot\frac{\pi}{4}}\end{bmatrix}\\\begin{bmatrix}1\\e^{j\cdot\frac{\pi}{4}}\end{bmatrix}e^{j\cdot\frac{3\pi}{2}}\end{bmatrix}$ | $\frac{1}{2}\begin{bmatrix}\begin{bmatrix}1\\e^{j\cdot\frac{\pi}{2}}\end{bmatrix}\\\begin{bmatrix}1\\e^{j\cdot\frac{\pi}{2}}\end{bmatrix}e^{j\cdot\frac{3\pi}{2}}\end{bmatrix}$ | $\frac{1}{2}\begin{bmatrix}\begin{bmatrix}1\\e^{j\cdot\frac{3\pi}{4}}\end{bmatrix}\\\begin{bmatrix}1\\e^{j\cdot\frac{3\pi}{4}}\end{bmatrix}e^{j\cdot\frac{3\pi}{2}}\end{bmatrix}$ |
| 28 to 31 | $\frac{1}{2}\begin{bmatrix}\begin{bmatrix}1\\e^{j\cdot\pi}\end{bmatrix}\\\begin{bmatrix}1\\e^{j\cdot\pi}\end{bmatrix}e^{j\cdot\frac{3\pi}{2}}\end{bmatrix}$ | $\frac{1}{2}\begin{bmatrix}\begin{bmatrix}1\\e^{j\cdot\frac{5\pi}{8}}\end{bmatrix}\\\begin{bmatrix}1\\e^{j\cdot\frac{5\pi}{8}}\end{bmatrix}e^{j\cdot\frac{3\pi}{2}}\end{bmatrix}$ | $\frac{1}{2}\begin{bmatrix}\begin{bmatrix}1\\e^{j\cdot\frac{6\pi}{8}}\end{bmatrix}\\\begin{bmatrix}1\\e^{j\cdot\frac{6\pi}{8}}\end{bmatrix}e^{j\cdot\frac{3\pi}{2}}\end{bmatrix}$ | $\frac{1}{2}\begin{bmatrix}\begin{bmatrix}1\\e^{j\cdot\frac{7\pi}{8}}\end{bmatrix}\\\begin{bmatrix}1\\e^{j\cdot\frac{7\pi}{8}}\end{bmatrix}e^{j\cdot\frac{3\pi}{2}}\end{bmatrix}$ |

FIG. 8B

PRECODING MATRIX DETERMINING METHOD AND APPARATUS

CROSS-REFERENCE TO RELATED APPLICATIONS

This application is a continuation of International Application No. PCT/CN2021/103275, filed on Jun. 29, 2021, which claims priority to Chinese Patent Application No. 202010605251.8, filed on Jun. 29, 2020. The disclosures of the aforementioned applications are hereby incorporated by reference in their entireties.

BACKGROUND

In a wireless communication system, communication may be classified into different types based on different types of sending nodes and receiving nodes. Usually, sending information to a terminal device by a network device is referred to as downlink (downlink, DL) communication, and sending information to a network device by a terminal device is referred to as uplink (uplink, UL) communication. In a 4th generation (fourth generation, 4G) wireless communication system and a 5th generation (fifth generation, 5G) wireless communication system, namely, a new radio access technology (new radio access technology, NR) system, for uplink transmission, diversity gains and multiplexing gains may be obtained through uplink precoding. In the 5G system, uplink precoding includes a codebook-based transmission mode and a non-codebook-based transmission mode. The codebook-based transmission mode may be used in frequency division duplex (frequency division duplex, FDD) and time division duplex (time division duplex, TDD) systems, and the non-codebook-based transmission mode is usually used in the TDD system. In the codebook-based transmission mode, a base station selects an appropriate codebook from a predefined uplink codebook set based on a channel state, and indicates an index of the selected codebook to a terminal through a control channel. In the non-codebook-based transmission mode, a base station selects an appropriate sounding reference signal resource index (sounding reference signal resource index, SRI) based on a channel state, and indicates the SRI to a terminal through a control channel. However, in the 4G system, only the codebook-based transmission mode is supported in uplink.

With the development of mobile communication and emergence of new services, a requirement for an uplink capacity is increasingly high. For example, in some video surveillance scenarios, a terminal needs to perform backhaul of a high-definition video to a base station. Therefore, a solution for improving the uplink capacity needs to be studied.

SUMMARY

Embodiments of this application disclose a precoding matrix determining method and an apparatus, to improve a capacity of uplink communication.

According to a first aspect, an embodiment of this application provides a precoding matrix determining method. The method includes: A terminal device receives first precoding indication information from a network device; and the terminal device determines, from a first codebook set, a first precoding matrix indicated by the first precoding indication information, where the first precoding matrix is for generating data to be sent on an antenna port of the terminal device, the first codebook set includes the first precoding matrix, a second precoding matrix, and a third precoding matrix, an element at a first position in the first precoding matrix is equal to a value of exponentiation with a first value as an exponent and a natural constant as a base, an element at a first position in the second precoding matrix is equal to a value of exponentiation with a second value as an exponent and a natural constant as a base, an element at a first position in the third precoding matrix is equal to a value of exponentiation with a third value as an exponent and a natural constant as a base, the first value, the second value, and the third value are different pure imaginary numbers, and at least one element in the first precoding matrix is a complex number whose real part and imaginary part are not zero.

The first precoding matrix, the second precoding matrix, and the third precoding matrix are matrices of a same size, for example, are matrices of four rows and one column. The first position may be any position, for example, row 2 column 1. A value of exponentiation with a natural constant as the base and a pure imaginary number as the exponent is a pure imaginary number or a complex number. For example, $$e^{j\frac{\pi}{4}} = \frac{\sqrt{2}}{2} + \frac{\sqrt{2}}{2}j, \ e^{j\frac{\pi}{2}} = j, \ e^{j\frac{3\pi}{4}} = -\frac{\sqrt{2}}{2} + \frac{\sqrt{2}}{2}j, \text{ and } e^{-j\frac{\pi}{2}} = -j.$$

Elements in a currently used precoding matrix include 0, k, −k, jk, and −jk, where k is a constant such as $$\frac{\sqrt{2}}{2}$$

and ½. It should be understood that the currently used precoding matrix does not include a complex number whose real part and imaginary part are not zero. Because the first value, the second value, and the third value are different pure imaginary numbers, the value of exponentiation with the first value as the exponent and the natural constant as the base, the value of exponentiation with the second value as the exponent and the natural constant as the base, and the value of exponentiation with the third value as the exponent and the natural constant as the base are different complex numbers or imaginary numbers. The element in the precoding matrix in the first codebook set may be a complex number whose real part and imaginary part are not zero, and is not limited to jk and −jk. Therefore, the first codebook set may include more precoding matrices.

In this embodiment of this application, the first codebook set has more precoding matrices and higher codebook precision, so that a capacity of uplink communication can be improved.

In an optional implementation, the method further includes: The terminal device determines a phase set based on codebook configuration information, where the phase set includes at least one phase value, and the codebook configuration information is information preconfigured by the terminal device or information received from the network device; and the terminal device generates the first codebook set based on the phase set, where any phase value in the phase set corresponds to a precoding matrix in the first codebook set.

Optionally, the phase set includes at least one group of phase values, and one group of phase values includes at least one phase value. For example, the phase set is $$\left\{0, \frac{2\pi}{N_1}, \frac{2\pi \times 2}{N_1}, \ldots, \frac{(N_1-1)\cdot 2\pi}{N_1}\right\},$$

and the phase set includes $N_1$ phase values, where $N_1$ is an integer greater than 1. For another example, the phase set is $$\left\{(0,0), \left(0, \frac{2\pi}{N_2}\right), \ldots, \left(0, \frac{(N_2-1)\cdot 2\pi}{N_2}\right),\right.$$
$$\left.\left(\frac{2\pi}{N_1}, 0\right), \left(\frac{2\pi}{N_1}, \frac{2\pi}{N_2}\right), \ldots, \left(\frac{(N_1-1)\cdot 2\pi}{N_1}, \frac{(N_2-1)\cdot 2\pi}{N_2}\right)\right\}.$$

The codebook configuration information may be codebook configuration information that is applicable to the terminal device and that is determined by the network device based on capability information, for example, a quantity of antenna ports, of the terminal device. The terminal device can generate the first codebook set based on the codebook configuration information, and the network device does not need to send the first codebook set, so that the codebook configuration information carries fewer parameters, and resource overheads are low. For example, the codebook configuration information includes quantized phase values $N_1$ and $N_2$. That the terminal device determines the phase set based on the codebook configuration information may be: The terminal device determines $$\theta = 0 : \frac{2\pi}{N_1} : \frac{(N_1-1)\cdot 2\pi}{N_1}$$

based on $N_1$, determines $$\varphi = 0 : \frac{2\pi}{N_2} : \frac{(N_2-1)\cdot 2\pi}{N_2}$$

based on $N_2$, and determines the phase set based on $\theta$ and $\varphi$. In the example, the phase set includes different combinations of $\theta$ and $\varphi$, for example, a combination of $$\frac{2\pi}{N_1}$$

and 0, and a combination of $$\frac{2\pi}{N_1}$$

and $$\frac{2\pi}{N_2}.$$

In this implementation, the terminal device generates the first codebook set based on the codebook configuration information from the network device, and resource overheads are low.

In an optional implementation, when a quantity of antenna ports of the terminal device is 2, a precoding matrix in the first codebook set satisfies:

$$v_2^{(1)} = \frac{1}{\sqrt{p\cdot q}}\begin{bmatrix}1\\B\end{bmatrix},$$

$v_2^{(1)}$ represents the precoding matrix in the first codebook set, the first codebook set is a codebook set (whose rank is 1) used by the terminal device to transmit one stream, $$B = \exp(j\theta), \theta = 0 : \frac{2\pi}{N_1} : \frac{(N_1-1)\cdot 2\pi}{N_1},$$

p is a quantity of rows of the precoding matrix, q is a quantity of columns of the precoding matrix, and $N_1$ is an integer greater than 1. Both p and q are integers not less than 1.

In this implementation, a value of an element in the precoding matrix is not limited to a pure imaginary number and a real number, and may alternatively be a complex number whose real part and imaginary part are not zero. The first codebook set has more precoding matrices and higher codebook precision.

In an optional implementation, when a quantity of antenna ports of the terminal device is 4, a precoding matrix in the first codebook set satisfies:

$$v_4^{(1)} = \frac{1}{\sqrt{p\cdot q}}\begin{bmatrix}\begin{bmatrix}1\\B\end{bmatrix}\\\begin{bmatrix}1\\D\end{bmatrix}\cdot\exp(j\varphi)\end{bmatrix},$$

where $v_4^{(1)}$ represents the precoding matrix in the first codebook set, the first codebook set is a codebook set used by the terminal device to transmit one stream, $$B, D \in \{\exp(j\theta)\}, \theta = 0 : \frac{2\pi}{N_1} : \frac{(N_1-1)\cdot 2\pi}{N_1}, \varphi = 0 : \frac{2\pi}{N_2} : \frac{(N_2-1)\cdot 2\pi}{N_2},$$

p is a quantity of rows of the precoding matrix, q is a quantity of columns of the precoding matrix, and both $N_1$ and $N_2$ are integers greater than 1. A value of an element in the precoding matrix is not limited to a pure imaginary number and a real number, and may alternatively be a complex number. The first codebook set has more precoding matrices. During actual application, $N_1$ and $N_2$ may be configured based on information such as a quantity of antenna ports of the terminal device. A quantity of precoding matrices in the first codebook set may be greater than a quantity of precoding matrices in a currently used codebook set corresponding to four antenna ports. In this way, precision of the first codebook set can be higher than precision of another codebook set corresponding to four antenna ports.

In this implementation, each precoding matrix in the first codebook set used by the terminal device meets the foregoing formula, and codebook precision is high.

In an optional implementation, the first codebook set is a codebook set corresponding to four antenna ports, the first codebook set is a codebook set determined by the terminal device based on a second codebook set, the second codebook set is a codebook set corresponding to two antenna ports, and any precoding matrix in the second codebook set is a submatrix of at least one precoding matrix in the first codebook set.

In this implementation, the terminal device may quickly determine, based on the codebook set corresponding to two antenna ports, the codebook set corresponding to four antenna ports.

In an optional implementation, when a quantity of antenna ports of the terminal device is 8, a precoding matrix in the first codebook set satisfies:

$$v_8^{(1)} = A_1 = \frac{1}{\sqrt{p \cdot q}} \begin{bmatrix} \begin{bmatrix} 1 \\ B \end{bmatrix} \\ \begin{bmatrix} 1 \\ D \end{bmatrix} \cdot \exp(j\varphi) \\ \begin{bmatrix} 1 \\ E \end{bmatrix} \\ \begin{bmatrix} 1 \\ F \end{bmatrix} \cdot \exp(j\varepsilon) \end{bmatrix} \cdot \exp(j\delta),$$

where $v_8^{(1)}$ represents the precoding matrix in the first codebook set, the first codebook set is a codebook set used by the terminal device to transmit one stream, $$B, D, E, F \in \{\exp(j\theta)\}, \theta = 0 : \frac{2\pi}{N_1} : \frac{(N_1 - 1) \cdot 2\pi}{N_1}, \varphi = 0 : \frac{2\pi}{N_2} : \frac{(N_2 - 1) \cdot 2\pi}{N_2},$$

$$\varepsilon = 0 : \frac{2\pi}{N_3} : \frac{(N_3 - 1) \cdot 2\pi}{N_3}, \delta = 0 : \frac{2\pi}{N_4} : \frac{(N_4 - 1) \cdot 2\pi}{N_4},$$

p is a quantity of rows of the precoding matrix, q is a quantity of columns of the precoding matrix, and $N_1$, $N_2$, $N_3$, and $N_4$ are all integers greater than 1. During actual application, $N_1$, $N_2$, $N_3$, and $N_4$ may be configured based on information such as a quantity of antenna ports of the terminal device. A quantity of precoding matrices in the first codebook set may be greater than a quantity of precoding matrices in a currently used codebook set corresponding to eight antenna ports. In this way, precision of the first codebook set can be higher than precision of another codebook set corresponding to eight antenna ports.

In this implementation, each precoding matrix in the first codebook set used by the terminal device meets the foregoing formula, and codebook precision is high.

In an optional implementation, the first codebook set is a codebook set corresponding to eight antenna ports, the first codebook set is a codebook set determined by the terminal device based on a third codebook set, the third codebook set is a codebook set corresponding to four antenna ports or a codebook set corresponding to two antenna ports, and any precoding matrix in the third codebook set is a submatrix of at least one precoding matrix in the first codebook set.

In this implementation, the terminal device may quickly determine, based on the codebook set corresponding to four antenna ports, the codebook set corresponding to eight antenna ports.

In an optional implementation, the codebook configuration information includes a quantized phase value, the quantized phase value is for determining the phase set, and the quantized phase value is positively correlated with precision of the first codebook set. Precision of the first codebook set is positively correlated with a quantity of precoding matrices in the first codebook set. In other words, a larger quantity of precoding matrices in the codebook set indicates higher precision of the codebook set.

For example, the codebook configuration information includes quantized phase values $N_1$ and $N_2$. The terminal device may determine $$\theta = 0 : \frac{2\pi}{N_1} : \frac{(N_1 - 1) \cdot 2\pi}{N_1}$$

based on $N_1$, determine $$\varphi = 0 : \frac{2\pi}{N_2} : \frac{(N_2 - 1) \cdot 2\pi}{N_2}$$

based on $N_2$, and determine the phase set based on θ and φ. Any phase value in the phase set corresponds to one group of values of θ and φ. θ has $N_1$ values, φ has $N_2$ values, and a quantity of phase values included in the phase set is a product of $N_1$ and $N_2$. It should be understood that one phase value or one group of phase values in the phase set corresponds to one precoding matrix in the first codebook set. Because the quantity of phase values included in the phase set is the product of $N_1$ and $N_2$, a larger value of $N_1$ and/or $N_2$ indicates higher precision of the first codebook set. It should be understood that the codebook configuration information includes different quantized phase values, and the terminal device may obtain codebook sets of different precision based on the quantized phase values. In other words, the network device may configure codebooks of different precision for the terminal device by using the codebook configuration information.

In this implementation, the terminal device may generate codebooks of different precision based on the codebook configuration information, to meet a requirement of the terminal device for codebook precision.

According to a second aspect, an embodiment of this application provides another precoding matrix determining method. The method includes: A network device determines, from a first codebook set, a first precoding matrix to be used by a terminal device for uplink transmission, where the first precoding matrix is for generating data to be sent on an antenna port of the terminal device, the first codebook set includes the first precoding matrix, a second precoding matrix, and a third precoding matrix, an element at a first position in the first precoding matrix is equal to a value of exponentiation with a first value as an exponent and a natural constant as a base, an element at a first position in the second precoding matrix is equal to a value of exponentiation with a second value as an exponent and a natural constant as a base, an element at a first position in the third precoding matrix is equal to a value of exponentiation with a third value as an exponent and a natural constant as a base, the first value, the second value, and the third value are different pure imaginary numbers, and at least one element in the first precoding matrix is a complex number whose real part and imaginary part are not zero; and the network device sends first precoding indication information to the terminal device, where the first precoding indication information indicates the first precoding matrix in the first codebook set.

In this embodiment of this application, the first codebook set has more precoding matrices and higher codebook precision, so that a capacity of uplink communication can be improved.

In an optional implementation, the method further includes: The network device sends codebook configuration information to the terminal device, where the codebook configuration information is used by the terminal device to determine a phase set including at least one phase value, the phase set is for generating the first codebook set, and any phase value in the phase set corresponds to a precoding matrix in the first codebook set.

In this implementation, the network device sends the codebook configuration information to the terminal device, so that the terminal device generates the first codebook set based on the codebook configuration information, to reduce resource overheads.

In an optional implementation, when a quantity of antenna ports of the terminal device is 4, a precoding matrix in the first codebook set satisfies:

$$v_4^{(1)} = \frac{1}{\sqrt{p \cdot q}} \begin{bmatrix} \begin{bmatrix} 1 \\ B \end{bmatrix} \\ \begin{bmatrix} 1 \\ D \end{bmatrix} \cdot \exp(j\varphi) \end{bmatrix},$$

where $v_4^{(1)}$ represents the precoding matrix in the first codebook set, the first codebook set is a codebook set used by the terminal device to transmit one stream, $$B, D \in \{\exp(j\theta)\}, \theta = 0 : \frac{2\pi}{N_1} : \frac{(N_1-1) \cdot 2\pi}{N_1}, \varphi = 0 : \frac{2\pi}{N_2} : \frac{(N_2-1) \cdot 2\pi}{N_2},$$

p is a quantity of rows of the precoding matrix, q is a quantity of columns of the precoding matrix, and both $N_1$ and $N_2$ are integers greater than 1.

In an optional implementation, the first codebook set is a codebook set corresponding to four antenna ports, the first codebook set is a codebook set determined by the terminal device based on a second codebook set, the second codebook set is a codebook set corresponding to two antenna ports, and any precoding matrix in the second codebook set is a submatrix of at least one precoding matrix in the first codebook set.

In an optional implementation, when a quantity of antenna ports of the terminal device is 8, a precoding matrix in the first codebook set satisfies:

$$v_8^{(1)} = A_1 = \frac{1}{\sqrt{p \cdot q}} \begin{bmatrix} \begin{bmatrix} 1 \\ B \end{bmatrix} \\ \begin{bmatrix} 1 \\ D \end{bmatrix} \cdot \exp(j\varphi) \\ \begin{bmatrix} 1 \\ E \end{bmatrix} \\ \begin{bmatrix} 1 \\ F \end{bmatrix} \cdot \exp(j\varepsilon) \end{bmatrix} \cdot \exp(j\delta) \end{bmatrix},$$

where $v_8^{(1)}$ represents the precoding matrix in the first codebook set, the first codebook set is a codebook set used by the terminal device to transmit one stream, $$B, D, E, F \in \{\exp(j\theta)\}, \theta = 0 : \frac{2\pi}{N_1} : \frac{(N_1-1) \cdot 2\pi}{N_1}, \varphi = 0 : \frac{2\pi}{N_2} : \frac{(N_2-1) \cdot 2\pi}{N_2},$$

$$\varepsilon = 0 : \frac{2\pi}{N_3} : \frac{(N_3-1) \cdot 2\pi}{N_3}, \delta = 0 : \frac{2\pi}{N_4} : \frac{(N_4-1) \cdot 2\pi}{N_4},$$

p is a quantity of rows of the precoding matrix, q is a quantity of columns of the precoding matrix, and $N_1$, $N_2$, $N_3$, and $N_4$ are all integers greater than 1.

In an optional implementation, the first codebook set is a codebook set corresponding to eight antenna ports, the first codebook set is a codebook set determined by the terminal device based on a third codebook set, the third codebook set is a codebook set corresponding to four antenna ports or a codebook set corresponding to two antenna ports, and any precoding matrix in the third codebook set is a submatrix of at least one precoding matrix in the first codebook set.

In an optional implementation, the codebook configuration information includes a quantized phase value, the quantized phase value is for determining the phase set, and the quantized phase value is positively correlated with precision of the first codebook set.

In this implementation, the network device sends, to the terminal device, the codebook configuration information including the quantized phase value, so that the terminal device generates codebooks of different precision based on the quantized phase value, to better meet a requirement of the terminal device for codebook precision.

According to a third aspect, an embodiment of this application provides a codebook generation method. The method includes: A terminal device receives codebook configuration information from a network device; the terminal device determines a phase set based on the codebook configuration information, where the phase set includes at least one phase value; and the terminal device generates the first codebook set based on the phase set, where any phase value in the phase set corresponds to a precoding matrix in the first codebook set.

In this embodiment of this application, the terminal device generates the first codebook set based on the codebook configuration information from the network device, and resource overheads are low.

According to a fourth aspect, an embodiment of this application provides another codebook generation method. The method includes: A network device generates codebook configuration information, where the codebook configuration information is used by a terminal device to determine a phase set including at least one phase value, the phase set is for generating a first codebook set, and any phase value in the phase set corresponds to a precoding matrix in the first codebook set; and the network device sends the codebook configuration information to the terminal device.

In this embodiment of this application, the network device sends the codebook configuration information to the terminal device, so that the terminal device generates the first codebook set based on the codebook configuration information, to reduce resource overheads.

According to a fifth aspect, an embodiment of this application provides a communication apparatus. The communication apparatus includes: a transceiver unit, configured to receive first precoding indication information from a network device; and a processing unit, configured to: determine, from a first codebook set, a first precoding matrix indicated by the first precoding indication information, where the first precoding matrix is for generating data to be sent on an antenna port of the terminal device, the first codebook set includes the first precoding matrix, a second precoding matrix, and a third precoding matrix, an element at a first position in the first precoding matrix is equal to a value of exponentiation with a first value as an exponent and a natural constant as a base, an element at a first position in the second precoding matrix is equal to a value of exponentiation with a second value as an exponent and a natural constant as a base, an element at a first position in the third precoding matrix is equal to a value of exponentiation with a third value as an exponent and a natural constant as a base, the first value, the second value, and the third value are different pure imaginary numbers, and at least one element in the first precoding matrix is a complex number whose real part and imaginary part are not zero.

In this embodiment of this application, the first codebook set has more precoding matrices and higher codebook precision, so that a capacity of uplink communication can be improved.

In an optional implementation, the processing unit is further configured to: determine a phase set based on codebook configuration information, where the phase set includes at least one phase value, and the codebook configuration information is information preconfigured by the terminal device or information received from the network device; and generate the first codebook set based on the phase set, where any phase value in the phase set corresponds to a precoding matrix in the first codebook set.

In an optional implementation, when a quantity of antenna ports is 4, a precoding matrix in the first codebook set satisfies:

$$v_4^{(1)} = \frac{1}{\sqrt{p \cdot q}} \begin{bmatrix} \begin{bmatrix} 1 \\ B \end{bmatrix} \\ \begin{bmatrix} 1 \\ D \end{bmatrix} \cdot \exp(j\varphi) \end{bmatrix},$$

where $v_4^{(1)}$ represents the precoding matrix in the first codebook set, the first codebook set is a codebook set used by the terminal device to transmit one stream, $$B, D \in \{\exp(j\theta)\}, \theta = 0 : \frac{2\pi}{N_1} : \frac{(N_1 - 1) \cdot 2\pi}{N_1}, \varphi = 0 : \frac{2\pi}{N_2} : \frac{(N_2 - 1) \cdot 2\pi}{N_2},$$

p is a quantity of rows of the precoding matrix, q is a quantity of columns of the precoding matrix, and both $N_1$ and $N_2$ are integers greater than 1.

In an optional implementation, the first codebook set is a codebook set corresponding to four antenna ports, the first codebook set is a codebook set determined by the terminal device based on a second codebook set, the second codebook set is a codebook set corresponding to two antenna ports, and any precoding matrix in the second codebook set is a submatrix of at least one precoding matrix in the first codebook set.

In an optional implementation, when a quantity of antenna ports is 8, a precoding matrix in the first codebook set satisfies:

$$v_8^{(1)} = A_1 = \frac{1}{\sqrt{p \cdot q}} \begin{bmatrix} \begin{bmatrix} \begin{bmatrix} 1 \\ B \end{bmatrix} \\ \begin{bmatrix} 1 \\ D \end{bmatrix} \cdot \exp(j\varphi) \end{bmatrix} \\ \begin{bmatrix} \begin{bmatrix} 1 \\ E \end{bmatrix} \\ \begin{bmatrix} 1 \\ F \end{bmatrix} \cdot \exp(j\varepsilon) \end{bmatrix} \cdot \exp(j\delta) \end{bmatrix},$$

where $v_8^{(1)}$ represents the precoding matrix in the first codebook set, the first codebook set is a codebook set used by the terminal device to transmit one stream, $$B, D, E, F \in \{\exp(j\theta)\}, \theta = 0 : \frac{2\pi}{N_1} : \frac{(N_1 - 1) \cdot 2\pi}{N_1}, \varphi = 0 : \frac{2\pi}{N_2} : \frac{(N_2 - 1) \cdot 2\pi}{N_2},$$

$$\varepsilon = 0 : \frac{2\pi}{N_3} : \frac{(N_3 - 1) \cdot 2\pi}{N_3}, \delta = 0 : \frac{2\pi}{N_4} : \frac{(N_4 - 1) \cdot 2\pi}{N_4},$$

p is a quantity of rows of the precoding matrix, q is a quantity of columns of the precoding matrix, and $N_1, N_2, N_3$, and $N_4$ are all integers greater than 1.

In an optional implementation, the first codebook set is a codebook set corresponding to eight antenna ports, the first codebook set is a codebook set determined by the terminal device based on a third codebook set, the third codebook set is a codebook set corresponding to four antenna ports or a codebook set corresponding to two antenna ports, and any precoding matrix in the third codebook set is a submatrix of at least one precoding matrix in the first codebook set.

In an optional implementation, the codebook configuration information includes a quantized phase value, the quantized phase value is for determining the phase set, and the quantized phase value is positively correlated with precision of the first codebook set.

For technical effects brought by the fifth aspect or the optional implementations, refer to the descriptions of the technical effects brought by the first aspect or the corresponding implementations.

According to a sixth aspect, an embodiment of this application provides a communication apparatus. The communication apparatus includes: a processing unit, configured to: determine, from a first codebook set, a first precoding matrix to be used by a terminal device for uplink transmission, where the first precoding matrix is for generating data to be sent on an antenna port of the terminal device, the first codebook set includes the first precoding matrix, a second precoding matrix, and a third precoding matrix, an element at a first position in the first precoding matrix is equal to a value of exponentiation with a first value as an exponent and a natural constant as a base, an element at a first position in the second precoding matrix is equal to a value of exponentiation with a second value as an exponent and a natural constant as a base, an element at a first position in the third precoding matrix is equal to a value of exponentiation with a third value as an exponent and a natural constant as a base, the first value, the second value, and the third value are different pure imaginary numbers, and at least one element in the first precoding matrix is a complex number whose real part and imaginary part are not zero; and a transceiver unit, configured to: send first precoding indication information to the terminal device, where the first precoding indication information indicates the first precoding matrix in the first codebook set.

In this embodiment of this application, the first codebook set has more precoding matrices and higher codebook precision, so that a capacity of uplink communication can be improved.

In an optional implementation, the transceiver unit is further configured to send codebook configuration information to the terminal device, where the codebook configuration information is used by the terminal device to determine a phase set including at least one phase value, the phase set is for generating the first codebook set, and any phase value in the phase set corresponds to a precoding matrix in the first codebook set.

In an optional implementation, when a quantity of antenna ports is 4, a precoding matrix in the first codebook set satisfies:

$$v_4^{(1)} = \frac{1}{\sqrt{p \cdot q}} \begin{bmatrix} \begin{bmatrix} 1 \\ B \end{bmatrix} \\ \begin{bmatrix} 1 \\ D \end{bmatrix} \cdot \exp(j\varphi) \end{bmatrix},$$

where $v_4^{(1)}$ represents the precoding matrix in the first codebook set, the first codebook set is a codebook set used by the terminal device to transmit one stream, $$B, D \in \{\exp(j\theta)\}, \theta = 0 : \frac{2\pi}{N_1} : \frac{(N_1 - 1) \cdot 2\pi}{N_1}, \varphi = 0 : \frac{2\pi}{N_2} : \frac{(N_2 - 1) \cdot 2\pi}{N_2},$$

p is a quantity of rows of the precoding matrix, q is a quantity of columns of the precoding matrix, and both $N_1$ and $N_2$ are integers greater than 1.

In an optional implementation, the first codebook set is a codebook set corresponding to four antenna ports, the first codebook set is a codebook set determined by the terminal device based on a second codebook set, the second codebook set is a codebook set corresponding to two antenna ports, and any precoding matrix in the second codebook set is a submatrix of at least one precoding matrix in the first codebook set.

In an optional implementation, when a quantity of antenna ports is 8, a precoding matrix in the first codebook set satisfies:

$$v_8^{(1)} = A_1 = \frac{1}{\sqrt{p \cdot q}} \begin{bmatrix} \begin{bmatrix} \begin{bmatrix} 1 \\ B \end{bmatrix} \\ \begin{bmatrix} 1 \\ D \end{bmatrix} \cdot \exp(j\varphi) \end{bmatrix} \\ \begin{bmatrix} \begin{bmatrix} 1 \\ E \end{bmatrix} \\ \begin{bmatrix} 1 \\ F \end{bmatrix} \cdot \exp(j\varepsilon) \end{bmatrix} \cdot \exp(j\delta) \end{bmatrix},$$

where $v_8^{(1)}$ represents the precoding matrix in the first codebook set, the first codebook set is a codebook set used by the terminal device to transmit one stream, $$B, D, E, F \in \{\exp(j\theta)\}, \theta = 0 : \frac{2\pi}{N_1} : \frac{(N_1 - 1) \cdot 2\pi}{N_1}, \varphi = 0 : \frac{2\pi}{N_2} : \frac{(N_2 - 1) \cdot 2\pi}{N_2},$$

$$\varepsilon = 0 : \frac{2\pi}{N_3} : \frac{(N_3 - 1) \cdot 2\pi}{N_3}, \delta = 0 : \frac{2\pi}{N_4} : \frac{(N_4 - 1) \cdot 2\pi}{N_4},$$

p is a quantity of rows of the precoding matrix, q is a quantity of columns of the precoding matrix, and $N_1$, $N_2$, $N_3$, and $N_4$ are all integers greater than 1.

In an optional implementation, the first codebook set is a codebook set corresponding to eight antenna ports, the first codebook set is a codebook set determined by the terminal device based on a third codebook set, the third codebook set is a codebook set corresponding to four antenna ports or a codebook set corresponding to two antenna ports, and any precoding matrix in the third codebook set is a submatrix of at least one precoding matrix in the first codebook set.

In an optional implementation, the codebook configuration information includes a quantized phase value, the quantized phase value is for determining the phase set, and the quantized phase value is positively correlated with precision of the first codebook set.

For technical effects brought by the sixth aspect or the optional implementations, refer to the descriptions of the technical effects brought by the second aspect or the corresponding implementations.

According to a seventh aspect, an embodiment of this application provides a communication apparatus. The communication apparatus includes: a transceiver unit, configured to receive codebook configuration information from a network device; and a processing unit, configured to: determine a phase set based on the codebook configuration information, where the phase set includes at least one phase value; and generate a first codebook set based on the phase set, where any phase value in the phase set corresponds to a precoding matrix in the first codebook set.

According to an eighth aspect, an embodiment of this application provides a communication apparatus. The communication apparatus includes: a processing unit, configured to generate codebook configuration information, where the codebook configuration information is used by a terminal device to determine a phase set including at least one phase value, the phase set is for generating a first codebook set, and any phase value in the phase set corresponds to a precoding matrix in the first codebook set; and a transceiver unit, configured to send the codebook configuration information to the terminal device.

According to a ninth aspect, this application provides a communication apparatus. The communication apparatus includes a processor, a memory, and a transceiver. The transceiver is configured to receive a signal or send a signal. The memory is configured to store computer code. The processor is configured to execute the computer code, so that the communication apparatus performs the method in the first aspect or any optional implementation of the first aspect.

According to a tenth aspect, this application provides a communication apparatus. The communication apparatus includes a processor, a memory, and a transceiver. The transceiver is configured to receive a signal or send a signal. The memory is configured to store computer code. The processor is configured to execute the computer code, so that the communication apparatus performs the method in the second aspect or any optional implementation of the second aspect.

According to an eleventh aspect, this application provides a communication apparatus. The communication apparatus includes a processor, a memory, and a transceiver. The transceiver is configured to receive a signal or send a signal. The memory is configured to store computer code. The processor is configured to execute the computer code, so that the communication apparatus performs the method in the third aspect or any optional implementation of the third aspect.

According to a twelfth aspect, this application provides a communication apparatus. The communication apparatus includes a processor, a memory, and a transceiver. The transceiver is configured to receive a signal or send a signal. The memory is configured to store computer code. The processor is configured to execute the computer code, so that the communication apparatus performs the method in the fourth aspect or any optional implementation of the fourth aspect.

According to a thirteenth aspect, an embodiment of this application provides a communication apparatus. The communication apparatus includes a processing circuit and an interface circuit. The interface circuit is configured to receive first precoding indication information from a network device. The processing circuit is configured to: determine, from a first codebook set, a first precoding matrix indicated by the first precoding indication information, where the first precoding matrix is for generating data to be sent on an antenna port of the terminal device, the first codebook set includes the first precoding matrix, a second precoding matrix, and a third precoding matrix, an element at a first position in the first precoding matrix is equal to a value of exponentiation with a first value as an exponent and a natural constant as a base, an element at a first position in the second precoding matrix is equal to a value of exponentiation with a second value as an exponent and a natural constant as a base, an element at a first position in the third precoding matrix is equal to a value of exponentiation with a third value as an exponent and a natural constant as a base, and the first value, the second value, and the third value are different pure imaginary numbers.

According to a fourteenth aspect, an embodiment of this application provides a communication apparatus. The communication apparatus includes a processing circuit and an interface circuit. The processing circuit is configured to: determine, from a first codebook set, a first precoding matrix to be used by a terminal device for uplink transmission, where the first precoding matrix is for generating data to be sent on an antenna port of the terminal device, the first codebook set includes the first precoding matrix, a second precoding matrix, and a third precoding matrix, an element at a first position in the first precoding matrix is equal to a value of exponentiation with a first value as an exponent and a natural constant as a base, an element at a first position in the second precoding matrix is equal to a value of exponentiation with a second value as an exponent and a natural constant as a base, an element at a first position in the third precoding matrix is equal to a value of exponentiation with a third value as an exponent and a natural constant as a base, and the first value, the second value, and the third value are different pure imaginary numbers. The interface circuit is configured to send first precoding indication information to the terminal device under control of the processing circuit, where the first precoding indication information indicates the first precoding matrix in the first codebook set.

According to a fifteenth aspect, this application provides a communication apparatus. The communication apparatus includes a processing circuit and an interface circuit. The interface circuit is configured to receive codebook configuration information from a network device. The processing circuit is configured to: determine a phase set based on the codebook configuration information, where the phase set includes at least one phase value; and generate a first codebook set based on the phase set, where any phase value in the phase set corresponds to a precoding matrix in the first codebook set.

According to a sixteenth aspect, this application provides a communication apparatus. The communication apparatus includes a processing circuit and an interface circuit. The processing circuit is configured to generate codebook configuration information, where the codebook configuration information is used by a terminal device to determine a phase set including at least one phase value, the phase set is for generating a first codebook set, and any phase value in the phase set corresponds to a precoding matrix in the first codebook set. The interface circuit is configured to send the codebook configuration information to the terminal device.

According to a seventeenth aspect, this application provides a computer-readable storage medium. The computer-readable storage medium is configured to store a computer program. When the computer program is run on a computer, the method in the first aspect or any optional implementation of the first aspect is performed.

According to an eighteenth aspect, this application provides a computer-readable storage medium. The computer-readable storage medium is configured to store a computer program. When the computer program is run on a computer, the method in the second aspect or any optional implementation of the second aspect is performed.

According to a nineteenth aspect, this application provides a computer-readable storage medium. The computer-readable storage medium is configured to store a computer program. When the computer program is run on a computer, the method in the third aspect or any optional implementation of the third aspect is performed.

According to a twentieth aspect, this application provides a computer-readable storage medium. The computer-readable storage medium is configured to store a computer program. When the computer program is run on a computer, the method in the fourth aspect or any optional implementation of the fourth aspect is performed.

According to a twenty-first aspect, this application provides a computer program product. The computer program product includes a computer program or computer code. When the computer program product runs on a computer, the method in the first aspect or any optional implementation of the first aspect is performed.

According to a twenty-second aspect, this application provides a computer program product. The computer program product includes a computer program or computer code. When the computer program product runs on a computer, the method in the second aspect or any optional implementation of the second aspect is performed.

According to a twenty-third aspect, this application provides a computer program product. The computer program product includes a computer program or computer code. When the computer program product runs on a computer, the method in the third aspect or any optional implementation of the third aspect is performed.

According to a twenty-fourth aspect, this application provides a computer program product. The computer program product includes a computer program or computer code. When the computer program product runs on a computer, the method in the fourth aspect or any optional implementation of the fourth aspect is performed.

According to a twenty-fifth aspect, this application provides a wireless communication system. The wireless communication system includes a network device and a terminal device. The network device is configured to generate the first precoding indication information, or the network device is configured to send the codebook configuration information; and the terminal device is configured to perform the method in the first aspect or any possible implementation of the first aspect, or is configured to perform the method in the second aspect or any possible implementation of the second aspect.

BRIEF DESCRIPTION OF DRAWINGS

To describe technical solutions in embodiments of this application or in the background more clearly, the following describes the accompanying drawings used in describing embodiments of this application or the background.

FIG. 4 is an example of a codebook set used by a terminal device to transmit one stream according to an embodiment of this application;

FIG. 5 is a flowchart of a precoding matrix determining method according to an embodiment of this application;

FIG. 6 is an example of a mapping relationship between a TPMI index and a precoding matrix when a quantity of antenna ports is 2 and a maximum rank is 1 according to an embodiment of this application;

FIG. 7 is an example of a mapping relationship between a TPMI index and a precoding matrix when a quantity of antenna ports is 2 and a maximum rank is 2 according to an embodiment of this application;

FIG. 8A and FIG. 8B each show an example of a mapping relationship between a TPMI index and a precoding matrix when a quantity of antenna ports is 4 and a maximum rank is 1 according to an embodiment of this application;

DESCRIPTION OF EMBODIMENTS

Figures 1, 2, 3:
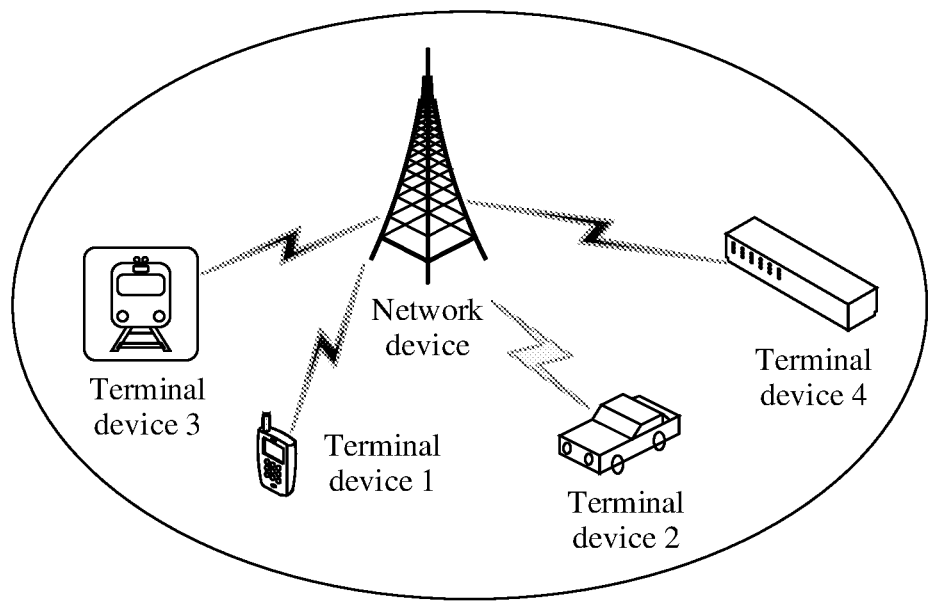
FIG. 1 is a schematic diagram of an architecture of a communication system according to this application.
FIG. 2 is an example of a codebook set used by a terminal device to transmit one stream according to an embodiment of this application.
FIG. 3 is an example of a codebook set used by a terminal device to transmit two streams according to an embodiment of this application.

To make the objectives, technical solutions, and advantages of this application clearer, the following further describes this application with reference to the accompanying drawings.

In the specification, claims, and accompanying drawings of this application, the terms "first", "second", and the like are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another step or unit inherent to the process, the method, the product, or the device.

"Embodiment" mentioned in this specification means that a particular feature, structure, or characteristic described with reference to the embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

In this application, "at least one (item)" means one or more, "a plurality of" means two or more, and "at least two (items)" means two or three or more. The term "and/or" is used to describe an association relationship between associated objects and indicates that three relationships may exist. For example, "A and/or B" may indicate the following three cases: Only A exists, only B exists, and both A and B exist, where A and B may be singular or plural. The character "/" usually indicates an "or" relationship between the associated objects. "At least one (item) of the following" or a similar expression thereof means any combination of these items. For example, at least one (item) of a, b, or c may represent a, b, c, "a and b", "a and c", "b and c", or "a, b, and c".

The following describes in detail a network architecture in this application.

The technical solutions provided in this application may be applied to various communication systems, for example, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communication system, a 5th generation (5th generation, 5G) communication system, a new radio (new radio, NR) communication system, or another future communication system such as a 6G communication system. Optionally, the technical solutions provided in this application may be further applied to an Internet of Things (internet of things, IoT) system, a narrowband Internet of Things (narrowband internet of things, NB-IoT) system, and the like. A communication system used in technical solutions provided in this application includes at least two entities. One entity (for example, a base station) can send downlink data and indication information, and the other entity (for example, a terminal device) can receive the indication information and can send uplink feedback information. It should be understood that the technical solutions provided in this application are applicable to any communication system that includes the at least two entities.

FIG. 1 is a schematic diagram of an architecture of a communication system according to this application. As shown in FIG. 1, the communication system includes one or more network devices, and that only one network device is included is used as an example in FIG. 1. One or more terminal devices are connected to the network device, and that only four terminal devices are connected to the network device is used as an example in FIG. 1.

The network device may be a device that can communicate with the terminal device. The network device may be any device having a wireless transceiver function. The network device may be a base station, an access point, or a transmission reception point (transmission reception point, TRP), or may be a device that is in an access network and that communicates with the terminal device over an air interface by using one or more cell (cells), or the like. This is not limited in this application. For example, the base station may be an evolved NodeB (evolved NodeB, eNB, or eNodeB) in LTE, a relay station or an access point, or a next generation base station (next generation, gNB) in a 5G network. It may be understood that the base station may alternatively be a base station in a future evolved public land mobile network (public land mobile network, PLMN), or the like.

Optionally, the network device may alternatively be an access node, a wireless relay node, a wireless backhaul node, or the like in a wireless local area network (wireless fidelity, Wi-Fi) system.

Optionally, the network device may be a radio controller in a cloud radio access network (cloud radio access network, CRAN) scenario.

For ease of description, the following uses a base station as an example to describe a network device and the like in this application. Optionally, in some deployment of the base station, the base station may include a central unit (central unit, CU), a distributed unit (distributed unit, DU), and the like. In some other deployment of the base station, the CU may be further divided into a CU-control plane (control plane, CP), a CU-user plane (user plane, UP), and the like. In some other deployment of the base station, the base station may alternatively be an open radio access network (open radio access network, ORAN) architecture or the like. A specific deployment manner of the base station is not limited in this application.

The terminal device may also be referred to as user equipment (user equipment, UE). The terminal device in this application is a device having a wireless transceiver function, and may communicate with one or more core network (core network, CN) devices (which may also be referred to as core devices) through an access network device (which may also be referred to as an access device) in a radio access network (radio access network, RAN). The terminal device may send an uplink signal to the network device and/or receive a downlink signal from the network device. The terminal device may include a mobile phone, a vehicle, a tablet computer, a smart speaker, a train detector, a gas station, and the like. Main functions of the terminal device include collecting data (a part of terminal devices), receiving control information and downlink data from the network device, and transmitting uplink data to the network device. Optionally, the terminal device may also be referred to as an access terminal, a terminal, a subscriber unit, a subscriber station, a mobile station, a remote station, a remote terminal, a mobile device, a user terminal, a wireless network device, a user agent, a user apparatus, or the like. Optionally, the terminal device may be deployed on land, where the deployment includes indoor or outdoor, or handheld or vehicle-mounted deployment, the terminal device may be deployed on water (for example, on a ship), or the terminal device may be deployed in air (for example, on an airplane, a balloon, or a satellite). Optionally, the terminal device may be a handheld device, a vehicle-mounted device, or a wearable device that has a wireless communication function, a terminal in the internet of things or the internet of vehicles, a terminal in any form in a 5G network or a future network, or the like. This is not limited in this application.

Optionally, in the communication system shown in FIG. 1, communicate between the terminal devices may further be performed by using a technology such as device to device (device to device, D2D), vehicle-to-everything (vehicle-to-everything, V2X), or machine to machine (machine to machine, M2M). A communication method between the terminal devices is not limited in this application.

In the communication system shown in FIG. 1, a network device and any terminal device may be configured to perform the method provided in embodiments of this application.

The following describes in detail some backgrounds of this application.

Codebook-Based Uplink Transmission Scheme

In multiple-input multiple-output (multiple-input multiple-output, MIMO) transmission, a terminal device or a network device may implement spatial diversity and spatial multiplexing by using transmit end precoding. The spatial diversity helps improve signal transmission reliability, and the spatial multiplexing helps transmit a plurality of parallel data streams at the same time. For both spatial diversity and spatial multiplexing, precoding is required to match channels well. In uplink codebook-based transmission, precoding is determined on a base station side. If the base station directly indicates each element in the precoding matrix, overheads of downlink control indicator (Downlink Control Indicator, DCI) are large. Therefore, a currently used solution is to select a precoding matrix from a limited codebook set. A codebook-based uplink transmission solution is as follows: A terminal device sends a sounding reference signal (sounding reference signal, SRS) to a network device; the network device determines, from a limited codebook set based on the SRS from the terminal device, an index of a precoding matrix to be used by the terminal device for uplink transmission, and sends, to the terminal device, a transmission precoding indicator (transmit precoding matrix indicator, TPMI) indicating the index; and the terminal device obtains, from the codebook set based on the TPMI, the precoding matrix indicated by the index, and performs uplink transmission by using the precoding matrix. In this solution, the network device and the terminal device store at least one same codebook. The following describes some codebook sets.

Codebook Set

FIG. 2 shows an example of a codebook set (corresponding to two antenna ports) used by a terminal device to transmit one stream (rank1) according to an embodiment of this application. In FIG. 2, a TPMI represents an index of a corresponding codebook set (the indexes are sorted in ascending order from left to right), each index corresponds to a precoding matrix in the codebook set, and each precoding matrix is a matrix with two rows and one column (corresponding to one stream). FIG. 3 shows an example of a codebook set (corresponding to two antenna ports) used by a terminal device to transmit two streams (rank2) according to an embodiment of this application. In FIG. 3, a TPMI represents an index of a corresponding codebook set (the indexes are sorted in ascending order from left to right), each index corresponds to a precoding matrix in the codebook set, and each precoding matrix is a matrix with two rows and two columns (corresponding to two streams).

FIG. 4 shows an example of a codebook set (corresponding to four antenna ports) used by a terminal device to transmit one stream according to an embodiment of this application. In FIG. 4, a TPMI represents an index of a corresponding codebook set (the indexes are sorted in ascending order), each index corresponds to a precoding matrix in the codebook set, and each precoding matrix is a matrix with four rows and one column (corresponding to one stream).

It can be learned from FIG. 2 to FIG. 4 that elements in the precoding matrix include only 0, 1, −1, j, and −j. These codebook sets (corresponding to codebook sets with two antenna ports and codebook sets with four antenna ports) include a small quantity of precoding matrices, and there are not enough available indexes. Consequently, precision of the codebook set is not high enough, uplink MIMO transmission performance is affected, and an uplink capacity is not improved. In addition, when the quantity of antenna ports of the terminal device remains unchanged, the codebook set used by the terminal device remains unchanged in an entire communication process. In other words, these codebook sets are fixed and cannot be adjusted based on an actual situation.

The Base Station Indicating the Precoding Matrix to the Terminal Device

After the base station determines the precoding matrix to be used by the terminal device for uplink transmission, the base station needs to send, to the terminal device before the terminal device performs uplink data transmission by using the physical uplink shared channel (physical uplink shared channel, PUSCH), the TPMI indicating the precoding matrix. Otherwise, the terminal device does not know which precoding matrix should be selected. In some possible solutions, the base station indicates the TPMI in the DCI. A bit length of the TPMI indicated by the DCI is related to an uplink MIMO transmission mode, transmitted stream (Rank), and a quantity of antenna ports. For example, when a higher layer parameter txConfig of the terminal device is configured as nonCodebook (configured by using radio resource control signaling), it indicates that the terminal device uses a non-codebook transmission mode, and the TPMI does not need to be indicated. In this case, the bit length is 0. When the quantity of transmit antenna ports of the terminal device is 1, the network device does not need to indicate the TPMI either. When txConfig of the terminal device is configured as codebook, selection of the codebook set is related to the antenna port and the transmitted stream, and the bit length of the TPMI is positively correlated with a quantity of elements in the codebook set.

Data Mapping

After the terminal device receives the precoding matrix indicated by the base station, a mathematical formula corresponding to a process in which the terminal device maps transmitted data to each antenna port is as follows:

$$\begin{bmatrix} z^{(p_0)}(i) \\ \vdots \\ z^{(p_{P-1})}(i) \end{bmatrix} = W \begin{bmatrix} y^{(0)}(i) \\ \vdots \\ y^{(v-1)}(i) \end{bmatrix}. \quad (1)$$

W is a precoding matrix used by the terminal device; $y^{(v-1)}(i)$ (is data before precoding, and v is a layer index; and $z^{(p_{P-1})}(i)$ is data after precoding, and corresponds to data on an antenna port $p_{P-1}$. For example, for one stream (Rank is 1) transmission of two antenna ports, $$\begin{bmatrix} z^{(p_0)}(i) \\ \vdots \\ z^{(p_0+1)}(i) \end{bmatrix} = W \cdot y^{(0)}(i),$$

where W represents a precoding matrix whose dimension is two rows and one column. In a case of single-antenna transmission, W is 1 by default, which is equivalent to that precoding is not performed.

Configuration of a Maximum Rank (Rank) Value

A maximum rank value is configured by using maxRank in radio resource control (Radio Resource Control, RRC) signaling IE PUSCH-Config.

It can be learned from above that the codebook set has a problem of low codebook precision. To be specific, the codebook set has a small quantity of precoding matrices. Therefore, a codebook set with higher precision needs to be studied, to improve an uplink capacity by using the codebook set with higher precision. An embodiment of this application provides a precoding matrix determining method, to improve an uplink capacity by using a codebook set with higher precision.

FIG. 5 is a flowchart of a precoding matrix determining method according to an embodiment of this application. The method may be applied to the communication system shown in FIG. 1. As shown in FIG. 5, the method includes the following steps.

501: A terminal device receives first precoding indication information from a network device.

The first precoding indication information indicates a first precoding matrix in a first codebook set. Optionally, the first precoding indication information is DCI. Optionally, a TPMI index carried in the first precoding indication information indicates the first precoding matrix.

502: The terminal device determines, from the first codebook set, the first precoding matrix indicated by the first precoding indication information.

The first precoding matrix is for generating data to be sent on an antenna port of the terminal device. The first codebook set includes the first precoding matrix, a second precoding matrix, and a third precoding matrix, an element at a first position in the first precoding matrix is equal to a value of exponentiation with a first value as an exponent and a natural constant as a base, an element at a first position in the second precoding matrix is equal to a value of exponentiation with a second value as an exponent and a natural constant as a base, an element at a first position in the third precoding matrix is equal to a value of exponentiation with a third value as an exponent and a natural constant as a base, the first value, the second value, and the third value are different pure imaginary numbers, and at least one element in the first precoding matrix is a complex number whose real part and imaginary part are not zero.

Optionally, the first precoding indication information includes a TPMI index (index), and the TPMI index indicates the first precoding matrix in the first codebook set. The terminal device may store a mapping relationship between a TPMI index and a precoding matrix. The terminal device may determine, based on the mapping relationship, a precoding matrix corresponding to any TPMI index.

Because the first value, the second value, and the third value are different pure imaginary numbers, the value of exponentiation with the first value as the exponent and the natural constant as the base, the value of exponentiation with the second value as the exponent and the natural constant as the base, and the value of exponentiation with the third value as the exponent and the natural constant as the base are different complex numbers or imaginary numbers. The element in the precoding matrix in the first codebook set may be a complex number whose real part and imaginary part are not zero, and is not limited to jk and −jk. Therefore, the first codebook set may include more precoding matrices. In other words, codebook precision of the first codebook set is higher.

In some embodiments, the terminal device may simultaneously use two or more codebook sets with different precision, and different codebook sets correspond to different TPMI index ranges. For example, a quantity of antenna ports of the terminal device is 4, the terminal device may use the first codebook set and an original codebook set, a range of TPMI indexes corresponding to precoding matrices in the first codebook set is 0 to 31, and a range of TPMI indexes corresponding to precoding matrices in the original codebook set is 32 to 59. When the TPMI index indicated by the first precoding indication information falls within a range of 0 to 31, the precoding matrix is selected from the first codebook set; or when the TPMI index indicated by the first precoding indication information falls within a range of 32 to 59, the precoding matrix is selected from the original codebook set.

In this embodiment of this application, the first codebook set has more precoding matrices and higher codebook precision, so that a capacity of uplink communication can be improved.

In the foregoing embodiment, only some features of the precoding matrix in the first codebook set are described. The following describes in detail the first codebook set and the mapping relationship between the precoding matrix in the first codebook set and the TPMI index with reference to an example of the first codebook set.

For example, when the quantity of antenna ports of the terminal device is 2 and the terminal device transmits one stream (rank1), a precoding matrix in the first codebook set satisfies:

$$v_2^{(1)} = \frac{1}{\sqrt{p \cdot q}} \begin{bmatrix} 1 \\ B \end{bmatrix}. \quad (2)$$

$v_2^{(1)}$ represents the precoding matrix (namely, a precoding matrix whose quantity of antenna ports is 2 and rank is 1) in the first codebook set, the first codebook set is a codebook set (whose rank is 1) used by the terminal device to transmit one stream, $$B = \exp(j\theta), \theta = 0 : \frac{2\pi}{N_1} : \frac{(N_1 - 1) \cdot 2\pi}{N_1},$$

p is a quantity of rows of the precoding matrix, q is a quantity of columns of the precoding matrix, and $N_1$ is an integer greater than 1. A value of θ is a phase set, to be specific, $$\theta = 0 : \frac{2\pi}{N_1} : \frac{(N_1 - 1) \cdot 2\pi}{N_1}$$

may be understood as a phase set $$\left\{ 0, \frac{2\pi}{N_1}, \frac{2\pi \times 2}{N_1}, \ldots, \frac{(N_1 - 1) \cdot 2\pi}{N_1} \right\}.$$

It should be understood that a precoding matrix may be obtained by substituting a value of θ into Formula (2), and the first codebook set includes $N_1$ precoding matrices. Formula (2) may be considered as a formula for generating the first codebook set. The first codebook set may be obtained by the terminal device by substituting different values of θ into Formula (2). To be specific, one value of θ corresponds to one precoding matrix in the first codebook set. It should be understood that the first codebook set includes the $N_1$ precoding matrices, and each precoding matrix satisfies Formula (2). For example, when $N_1=4$, the value of θ is $$\left\{ 0, \frac{2\pi}{4}, \frac{4\pi}{4}, \frac{6\pi}{4} \right\},$$

and is $$\left\{ 0, \frac{\pi}{2}, \pi, \frac{3\pi}{2} \right\}$$

after simplification. For another example, when $N_1=8$, the value of θ is $$\left\{ 0, \frac{2\pi}{8}, \frac{4\pi}{8}, \frac{6\pi}{8}, \frac{8\pi}{8}, \frac{10\pi}{8}, \frac{12\pi}{8}, \frac{14\pi}{8} \right\},$$

and is $$\left\{ 0, \frac{\pi}{4}, \frac{\pi}{2}, \frac{3\pi}{4}, \pi, \frac{5\pi}{4}, \frac{3\pi}{2}, \frac{7\pi}{4} \right\}$$

simplification. In this codebook structure, $N_1$ and/or a phase θ need/needs to be indicated. A value of $N_1$ determines codebook precision. During actual application, the codebook precision may be adjusted by adjusting the value of $N_1$ based on different application requirements.

FIG. 6 shows an example of a mapping relationship between a TPMI index and a precoding matrix when a quantity of antenna ports is 2 and a maximum rank is 1 according to an embodiment of this application. Eight precoding matrices in FIG. 6 are precoding matrices in the first codebook set. TPMI indexes corresponding to the precoding matrices in FIG. 6 from left to right are sequentially 0 to 7. In other words, each index corresponds to one precoding matrix. For example, a TPMI index corresponding to $$\frac{1}{\sqrt{2}} \begin{bmatrix} 1 \\ e^{j \cdot 0} \end{bmatrix}$$

is 0, and a TPMI index corresponding to $$\frac{1}{\sqrt{2}} \begin{bmatrix} 1 \\ e^{j \cdot \frac{7\pi}{8}} \end{bmatrix}$$

is 7. In some embodiments, relationships between precoding information (corresponding to the first precoding indication information) indicated in DCI and TPMI indexes are shown in Table 1. For example, $\lceil \log_2(N_1) \rceil$ bits in the DCI indicate the precoding information, the $\lceil \log_2(N_1) \rceil$ bits represent indexes in the first column, and $\lceil \cdot \rceil$ is a ceiling function. In Table 1, the first column indicates precoding information (corresponding to TPMI indexes) indicated in the DCI, and each row indicates a correspondence between a TPMI and an indicated bit value. For example, $N_1$ is 8, $\lceil \log_2(N_1) \rceil$ is 3, and three bits in the DCI indicate the precoding information. For example, 000 indicates TPMI=0, 001 indicates TPMI=1, and 010 indicates TPMI=2.

TABLE 1

| Bit field mapped to index (Bit field mapped to index) | TPMI of a first codebook set |
|---|---|
| 0 | One layer (layer): TPMI = 0 |
| 1 | One layer (layer): TPMI = 1 |
| 2 | One layer (layer): TPMI = 2 |
| . . . | . . . |
| $N_1 - 1$ | One layer (layer): TPMI = $N_1 - 1$ |

For example, when the quantity of antenna ports of the terminal device is 2 and the terminal device transmits two streams (rank2), a precoding matrix in the first codebook set satisfies:

$$v_2^{(2)} = \frac{1}{\sqrt{p \cdot q}} \begin{bmatrix} 1 & 1 \\ B & -B \end{bmatrix}. \quad (3)$$

$v_2^{(2)}$ represents the precoding matrix (namely, a precoding matrix whose quantity of antenna ports is 2 and rank is 2) in the first codebook set, the first codebook set is a codebook set (whose rank is 2) used by the terminal device to transmit two streams, $$B = \exp(j\theta), \theta = 0; \frac{2\pi}{N_1} : \frac{(N_1 - 1) \cdot 2\pi}{N_1},$$

p is a quantity of rows of the precoding matrix, q is a quantity of columns of the precoding matrix, and $N_1$ is an integer greater than 1.

The first codebook set may be obtained by the terminal device by substituting different values of θ into Formula (3). To be specific, one value of θ corresponds to one precoding matrix in the first codebook set. Formula (3) may be considered as a formula for generating the first codebook set. For example, when a value of θ is $$\left\{ 0, \frac{2\pi}{4}, \frac{4\pi}{4}, \frac{6\pi}{4} \right\},$$

precoding matrices included in the first codebook set are $$v_{2,1}^{(2)} = \frac{1}{2}\begin{bmatrix} 1 & 1 \\ 1 & -1 \end{bmatrix}, v_{2,2}^{(2)} = \frac{1}{2}\begin{bmatrix} 1 & 1 \\ j & -j \end{bmatrix}, v_{2,3}^{(2)} = \frac{1}{2}\begin{bmatrix} 1 & 1 \\ -1 & 1 \end{bmatrix}, \text{ and}$$

$$v_{2,4}^{(2)} = \frac{1}{2}\begin{bmatrix} 1 & 1 \\ -j & j \end{bmatrix}.$$

$v_{2,k}^{(2)}$ represents a $k^{th}$ precoding matrix in the first codebook set. For another example, when a value of θ is $$\left\{ 0, \frac{\pi}{4}, \frac{\pi}{2}, \frac{3\pi}{4}, \pi, \frac{5\pi}{4}, \frac{3\pi}{2}, \frac{7\pi}{4} \right\},$$

precoding matrices included in the first codebook set are $$v_{2,1}^{(2)} = \frac{1}{2}\begin{bmatrix} 1 & 1 \\ 1 & -1 \end{bmatrix},$$

$$v_{2,2}^{(2)} = \frac{1}{2}\begin{bmatrix} 1 & 1 \\ \frac{\sqrt{2}}{2} + j\frac{\sqrt{2}}{2} & -\frac{\sqrt{2}}{2} - j\frac{\sqrt{2}}{2} \end{bmatrix},$$

$$v_{2,3}^{(2)} = \frac{1}{2}\begin{bmatrix} 1 & 1 \\ j & -j \end{bmatrix},$$

$$v_{2,4}^{(2)} = \frac{1}{2}\begin{bmatrix} 1 & 1 \\ -\frac{\sqrt{2}}{2} + j\frac{\sqrt{2}}{2} & \frac{\sqrt{2}}{2} + j\frac{\sqrt{2}}{2} \end{bmatrix},$$

$$v_{2,5}^{(2)} = \frac{1}{2}\begin{bmatrix} 1 & 1 \\ -1 & -1 \end{bmatrix},$$

$$v_{2,6}^{(2)} = \frac{1}{2}\begin{bmatrix} 1 & 1 \\ -\frac{\sqrt{2}}{2} - j\frac{\sqrt{2}}{2} & \frac{\sqrt{2}}{2} + j\frac{\sqrt{2}}{2} \end{bmatrix},$$

$$v_{2,7}^{(2)} = \frac{1}{2}\begin{bmatrix} 1 & 1 \\ -j & j \end{bmatrix}, \text{ and}$$

$$v_{2,8}^{(2)} = \frac{1}{2}\begin{bmatrix} 1 & 1 \\ \frac{\sqrt{2}}{2} - j\frac{\sqrt{2}}{2} & -\frac{\sqrt{2}}{2} + j\frac{\sqrt{2}}{2} \end{bmatrix}.$$

It should be noted that, in some cases, for ease of simplification, the first codebook set may include only several precoding matrices. For example, the first codebook set may include only the $1^{st}$ precoding matrix $v_{2,1}^{(2)}$ and the $2^{nd}$ precoding matrix $v_{2,2}^{(2)}$, because only a column order of the $3^{rd}$ precoding matrix is changed compared with that of the $1^{st}$ precoding matrix, and only a column order of the $4^{th}$ precoding matrix is changed compared with that of the $2^{nd}$ precoding matrix.

FIG. 7 shows an example of a mapping relationship between a TPMI index and a precoding matrix when a quantity of antenna ports is 2 and a maximum rank is 2 according to an embodiment of this application. Eight precoding matrices (that is, $N_1$ is 8) in FIG. 7 are precoding matrices in the first codebook set. TPMI indexes corresponding to the precoding matrices in FIG. 7 are sequentially 0 to 7. In other words, each index corresponds to one precoding matrix. For example, a TPMI index corresponding to $$\frac{1}{2}\begin{bmatrix} 1 & 1 \\ e^{j \cdot 0} & -e^{j \cdot 0} \end{bmatrix}$$

is 0, and a TPMI index corresponding to $$\frac{1}{2}\begin{bmatrix} 1 & 1 \\ e^{j \cdot \frac{7\pi}{8}} & -e^{j \cdot \frac{7\pi}{8}} \end{bmatrix}$$

is 7. In some embodiments, relationships between precoding information (corresponding to the first precoding indication information) indicated in DCI and TPMIs are shown in Table 2. For example, $\lceil \log_2(2N_1) \rceil$ bits in the DCI indicate the precoding information (corresponding to the TPMI), the $\lceil \log_2(2N_1) \rceil$ bits represent indexes in the first column, and $\lceil \cdot \rceil$ is a ceiling function. In Table 2, the first column indicates precoding information indicated in the DCI, and each row indicates a correspondence between a TPMI and an indicated bit value. For example, when $N_1$ is 8, $\lceil \log_2(2N_1) \rceil$ is 4, and four bits in the DCI indicate the precoding information. For example, 0000 indicates TPMI=0, 0010 indicates TPMI=2, and 1111 indicates TPMI=2*$N_1$−1, where * represents a multiplication sign.

TABLE 2

| Bit field mapped to index (Bit field mapped to index) | TPMI of a first codebook set |
|---|---|
| 0 | One layer (layer): TPMI = 0 |
| 1 | One layer (layer): TPMI = 1 |
| 2 | One layer (layer): TPMI = 2 |
| ... | ... |

TABLE 2-continued

| Bit field mapped to index (Bit field mapped to index) | TPMI of a first codebook set |
|---|---|
| $N_1 - 1$ | One layer (layer): TPMI = $N_1 - 1$ |
| $N_1$ | Two layers (layers): TPMI = 0 |
| ... | ... |
| $2*N_1 - 1$ | Two layers (layers): TPMI = $2*N_1 - 1$ |

For example, when the quantity of antenna ports of the terminal device is 4 and the terminal device transmits one stream (rank1), a precoding matrix in the first codebook set satisfies:

$$V_4^{(1)} = \frac{1}{\sqrt{p \cdot q}} \begin{bmatrix} \begin{bmatrix} 1 \\ B \end{bmatrix} \\ \begin{bmatrix} 1 \\ D \end{bmatrix} \cdot \exp(j\,\varphi) \end{bmatrix}. \quad (4)$$

$v_4^{(1)}$ represents the precoding matrix in the first codebook set, the first codebook set is a codebook set used by the terminal device to transmit one stream, $$B, D \in \{\exp(j\,\theta)\}, \theta = 0 : \frac{2\pi}{N_1} : \frac{(N_1 - 1) \cdot 2\pi}{N_1},$$

$$\varphi = 0 : \frac{2\pi}{N_2} : \frac{(N_2 - 1) \cdot 2\pi}{N_2},$$

p is a quantity of rows of the precoding matrix, q is a quantity of columns of the precoding matrix, and both $N_1$ and $N_2$ are integers greater than 1. The first codebook set may be obtained by the terminal device by substituting different values of θ and φ into Formula (4). To be specific, one group of values of θ and φ corresponds to one precoding matrix in the first codebook set. Formula (4) may be considered as a formula for generating the first codebook set. Formula (4) includes two parameters: θ and φ, and all or some combinations of values of θ and values of φ correspond to one phase set. In other words, the phase set includes different combinations of θ and φ, for example, a combination of $$\frac{2\pi}{N_1}$$

and 0, and a combination of $$\frac{2\pi}{N_1}$$

and $$\frac{2\pi}{N_2}.$$

The phase set may be $$\left\{(0,0), \left(0, \frac{2\pi}{N_2}\right), \ldots, \left(0, \frac{(N_2-1) \cdot 2\pi}{N_2}\right), \right.$$

$$\left. \left(\frac{2\pi}{N_1}, 0\right), \left(\frac{2\pi}{N_1}, \frac{2\pi}{N_2}\right), \ldots, \left(\frac{(N_1-1) \cdot 2\pi}{N_1}, \frac{(N_2-1) \cdot 2\pi}{N_2}\right)\right\}.$$

Any group of phase values in the phase set may be substituted into Formula (4) to obtain a precoding matrix in the first codebook set. It may be understood that the phase set includes $N_1 \times N_2$ groups of phase values, and the first codebook set includes $N_1 \times N_2$ precoding matrices. During actual application, for values of $N_1$ and $N_2$, impact of codebook precision and signaling indication overheads on a communication system needs to be comprehensively considered.

FIG. 8A and FIG. 8B each show an example of a mapping relationship between a TPMI index and a precoding matrix when a quantity of antenna ports is 4 and a maximum rank is 1 according to an embodiment of this application. 16 precoding matrices in FIG. 8A and 16 precoding matrices in FIG. 8B are precoding matrices in the first codebook set. TPMI indexes corresponding to the precoding matrices in FIG. 8A are sequentially 0 to 15, and TPMI indexes corresponding to the precoding matrices in FIG. 8B are sequentially 16 to 31. In other words, each TPMI index corresponds to one precoding matrix. For example, a TPMI index corresponding to $$\frac{1}{2} \begin{bmatrix} \begin{bmatrix} 1 \\ e^{j \cdot 0} \end{bmatrix} \\ \begin{bmatrix} 1 \\ e^{j \cdot 0} \end{bmatrix} e^{j \cdot 0} \end{bmatrix}$$

is 0, and a TPMI index corresponding to $$\frac{1}{2} \begin{bmatrix} \begin{bmatrix} 1 \\ e^{j\frac{7\pi}{8}} \end{bmatrix} \\ \begin{bmatrix} 1 \\ e^{j\frac{7\pi}{8}} \end{bmatrix} e^{j\frac{3\pi}{2}} \end{bmatrix}$$

is 31. The precoding matrices in FIG. 8A and FIG. 8B are precoding matrices generated by using $N_1=8$ and $N_2=4$ as an example, namely, $$\theta \in \left\{0, \frac{\pi}{4}, \frac{\pi}{2}, \frac{3\pi}{4}, \pi, \frac{5\pi}{4}, \frac{3\pi}{2}, \frac{7\pi}{4}\right\}$$

and $$\varphi \in \left\{0, \frac{\pi}{2}, \pi, \frac{3\pi}{2}\right\}.$$

Indexes corresponding to $N_1 \times N_2$ precoding matrices included in the first codebook set are 0, 1, 2, . . . , and $N_1 \times N_2 - 1$. In some embodiments, relationships between precoding information (corresponding to the first precoding indication information) indicated in DCI and TPMIs are shown in Table 3. For example, $\lceil \log_2(N_1 \cdot N_2) \rceil$ bits in the DCI indicate the precoding information (corresponding to the TPMI indexes), the $\lceil \log_2(N_1 \cdot N_2) \rceil$ bits represent TPMI indexes in the first column, $\lceil \cdot \rceil$ is a ceiling function, and $N_1 \cdot N_2$ represents a product of $N_1$ and $N_2$. In Table 3, the first column indicates precoding information (namely, TPMI indexes) indicated in the DCI, and each row indicates a correspondence between a TPMI and an indicated bit value. For example, when $N_1$ is 8 and $N_2$ is 4, $\lceil \log_2(N_1 \cdot N_2) \rceil$ is 5, and five bits in the DCI indicate the precoding information. For example, 00000 indicates TPMI=0, 00010 indicates TPMI=2, and 11111 indicates TPMI=$N_1$*$N_2$−1, where * represents a multiplication sign.

TABLE 3

| Bit field mapped to index (Bit field mapped to index) | TPMI of a first codebook set |
|---|---|
| 0 | One layer (layer): TPMI = 0 |
| 1 | One layer (layer): TPMI = 1 |
| 2 | One layer (layer): TPMI = 2 |
| ... | ... |
| $N_1$ | One layer (layer): TPMI = $N_1$ |
| $N_1$ + 1 | One layer (layer): TPMI = $N_1$ + 1 |
| ... | ... |
| $N_1$*$N_2$ − 1 | One layer (layer): TPMI = $N_1$*$N_2$ − 1 |

For example, when the quantity of antenna ports of the terminal device is 4 and the terminal device transmits two streams (rank2), a precoding matrix in the first codebook set satisfies:

$$V_4^{(2)} = \frac{1}{\sqrt{p \cdot q}} \begin{bmatrix} \begin{bmatrix} 1 \\ B \end{bmatrix} & \begin{bmatrix} 1 \\ B \end{bmatrix} \\ \begin{bmatrix} 1 \\ D \end{bmatrix} \cdot \exp(j\ \varphi) & -\begin{bmatrix} 1 \\ D \end{bmatrix} \cdot \exp(j\ \varphi) \end{bmatrix}. \quad (5)$$

$v_4^{(2)}$ represents the precoding matrix in the first codebook set, the first codebook set is a codebook set used by the terminal device to transmit two streams, $$B, D \in \{\exp(j\ \theta)\}, \theta = 0 : \frac{2\pi}{N_1} : \frac{(N_1 - 1) \cdot 2\pi}{N_1},$$

$$\varphi = 0 : \frac{2\pi}{N_2} : \frac{(N_2 - 1) \cdot 2\pi}{N_2},$$

different column vectors in $v_4^{(2)}$ are orthogonal, p is a quantity of rows of the precoding matrix, q is a quantity of columns of the precoding matrix, and both $N_1$ and $N_2$ are integers greater than 1. The first codebook set may be obtained by the terminal device by substituting different values of θ and φ into Formula (5). To be specific, one group of values of θ and φ corresponds to one precoding matrix in the first codebook set. Formula (5) may be considered as a formula for generating the first codebook set. Formula (5) includes two parameters: O and T, and all or some combinations of values of θ and values of φ correspond to one phase set. In other words, the phase set includes different combinations of θ and φ, for example, a combination of $$\frac{2\pi}{N_1}$$

and 0, and a combination of $$\frac{2\pi}{N_1}$$

and $$\frac{2\pi}{N_2}.$$

A mapping relationship between the TPMI index and the precoding matrix when the quantity of antenna ports is 4 and the maximum rank is 2 is similar to the mapping relationship between the TPMI index and the precoding matrix when the quantity of antenna ports is 4 and the maximum rank is 1. Indexes corresponding to $N_1 \times N_2$ precoding matrices included in the first codebook set are 0, 1, 2, . . . , and $N_1 \times N_2$−1. When the TPMI is indicated in the DCI, TPMIs including stream 1 (rank1) and stream 2 (rank2) occupies $\lceil \log_2(2 \cdot N_1 \cdot N_2) \rceil$ bits.

For example, when the quantity of antenna ports of the terminal device is 4 and the terminal device transmits three streams (rank3), a precoding matrix in the first codebook set satisfies:

$$V_4^{(3)} = \frac{1}{\sqrt{p \cdot q}} \begin{bmatrix} \begin{bmatrix} 1 \\ B \end{bmatrix} & \begin{bmatrix} 1 \\ -B \end{bmatrix} & \begin{bmatrix} 1 \\ B \end{bmatrix} \\ \begin{bmatrix} 1 \\ D \end{bmatrix} \cdot \exp(j\ \varphi) & \begin{bmatrix} 1 \\ -D \end{bmatrix} \cdot \exp(j\ \varphi) & -\begin{bmatrix} 1 \\ D \end{bmatrix} \cdot \exp(j\ \varphi) \end{bmatrix}. \quad (6)$$

$v_4^{(3)}$ represents the precoding matrix in the first codebook set, the first codebook set is a codebook set used by the terminal device to transmit three streams, $$B, D \in \{\exp(j\ \theta)\}, \theta = 0 : \frac{2\pi}{N_1} : \frac{(N_1 - 1) \cdot 2\pi}{N_1}, \varphi = 0 : \frac{2\pi}{N_2} : \frac{(N_2 - 1) \cdot 2\pi}{N_2},$$

different column vectors in $v_4^{(3)}$ are orthogonal, p is a quantity of rows of the precoding matrix, q is a quantity of columns of the precoding matrix, and both $N_1$ and $N_2$ are integers greater than 1. The first codebook set may be obtained by the terminal device by substituting different values of θ and φ into Formula (6). To be specific, one group of values of θ and φ corresponds to one precoding matrix in the first codebook set. Formula (6) may be considered as a formula for generating the first codebook set (corresponding to rank1). Formula (6) includes two parameters: θ and φ, and all or some combinations of values of θ and values of 9 correspond to one phase set. Any group of phase values in the phase set may be substituted into Formula (6) to obtain a precoding matrix in the first codebook set.

A mapping relationship between the TPMI index and the precoding matrix when the quantity of antenna ports is 4 and the maximum rank is 3 is similar to the mapping relationship between the TPMI index and the precoding matrix when the quantity of antenna ports is 4 and the maximum rank is 1. Indexes corresponding to $N_1 \times N_2$ precoding matrices included in the first codebook set are 0, 1, 2, . . . , and $N_1 \times N_2$−1. When the TPMI is indicated in the DCI, TPMIs including stream 1 (rank1), stream 2 (rank2), and stream 3 (rank3) occupies $\lceil \log_2(3 \cdot N_1 \cdot N_2) \rceil$ bits.

For example, when the quantity of antenna ports of the terminal device is 4 and the terminal device transmits four streams (rank4), a precoding matrix in the first codebook set satisfies:

$$V_4^{(4)} = \frac{1}{\sqrt{p \cdot q}} \left[ \begin{bmatrix} \begin{bmatrix} 1 \\ B \end{bmatrix} \\ \begin{bmatrix} 1 \\ D \end{bmatrix} \cdot \exp(j\ \varphi) \end{bmatrix} \begin{bmatrix} \begin{bmatrix} 1 \\ -B \end{bmatrix} \\ \begin{bmatrix} 1 \\ -D \end{bmatrix} \cdot \exp(j\ \varphi) \end{bmatrix} \begin{bmatrix} \begin{bmatrix} 1 \\ B \end{bmatrix} \\ -\begin{bmatrix} 1 \\ D \end{bmatrix} \cdot \exp(j\ \varphi) \end{bmatrix} \right]. \quad (7)$$

$V_4^{(4)}$ represents the precoding matrix in the first codebook set, the first codebook set is a codebook set used by the terminal device to transmit four streams, and meanings of parameters in Formula (7) are the same as the meanings of the parameters in Formula (6). The first codebook set may be obtained by the terminal device by substituting different values of θ and φ into Formula (7). To be specific, one group of values of θ and φ corresponds to one precoding matrix in the first codebook set. Formula (7) may be considered as a formula for generating the first codebook set (corresponding to rank2). Formula (7) includes two parameters: θ and φ, and all or some combinations of values of θ and values of θ correspond to one phase set. Any group of phase values in the phase set may be substituted into Formula (7) to obtain a precoding matrix in the first codebook set.

A mapping relationship between the TPMI index and the precoding matrix when the quantity of antenna ports is 4 and the maximum rank is 4 is similar to the mapping relationship between the TPMI index and the precoding matrix when the quantity of antenna ports is 4 and the maximum rank is 1. Indexes corresponding to $N_1 \times N_2$ precoding matrices included in the first codebook set are 0, 1, 2, . . . , and $N_1 \times N_2 - 1$. When the TPMI is indicated in the DCI, TPMIs including stream 1 (rank1), stream 2 (rank2), stream 3 (rank3), and stream 4 (rank4) occupies $\lceil \log_2(4 \cdot N_1 \cdot N_2) \rceil$ bits.

For example, when the quantity of antenna ports of the terminal device is 8 and the terminal device transmits one stream (rank1), a precoding matrix in the first codebook set satisfies:

$$V_8^{(1)} = A_1 = \frac{1}{\sqrt{p \cdot q}} \left[ \begin{bmatrix} \begin{bmatrix} 1 \\ B \end{bmatrix} \\ \begin{bmatrix} 1 \\ D \end{bmatrix} \cdot \exp(j\ \varphi) \end{bmatrix} \\ \begin{bmatrix} \begin{bmatrix} 1 \\ E \end{bmatrix} \\ \begin{bmatrix} 1 \\ F \end{bmatrix} \cdot \exp(j\ \varepsilon) \end{bmatrix} \cdot \exp(j\ \delta) \right]. \quad (8)$$

$V_8^{(1)}$ represents the precoding matrix in the first codebook set, the first codebook set is a codebook set used by the terminal device to transmit one stream, $$B, D, E, F \in \{\exp(j\ \theta)\}, \theta = 0 : \frac{2\pi}{N_1} : \frac{(N_1-1)\cdot 2\pi}{N_1},$$
$$\varphi = 0 : \frac{2\pi}{N_2} : \frac{(N_2-1)\cdot 2\pi}{N_2},$$
$$\varepsilon = 0 : \frac{2\pi}{N_3} : \frac{(N_3-1)\cdot 2\pi}{N_3}, \delta = 0 : \frac{2\pi}{N_4} : \frac{(N_4-1)\cdot 2\pi}{N_4},$$

p is a quantity of rows of the precoding matrix, q is a quantity of columns of the precoding matrix, and $N_1, N_2, N_3$, and $N_4$ are all integers greater than 1. The first codebook set may be obtained by the terminal device by substituting different values of θ, φ, ε, and δ into Formula (8). To be specific, one group of values of θ, φ, ε, and δ corresponds to one precoding matrix in the first codebook set. Formula (8) may be considered as a formula for generating the first codebook set. Formula (8) includes four parameters: θ, φ, ε, and δ, and all or some combinations of values of θ, values of φ, values of ε, and values of δ correspond to one phase set. Any group of phase values in the phase set may be substituted into Formula (8) to obtain a precoding matrix in the first codebook set.

When the quantity of antenna ports of the terminal device is 8 and the terminal device transmits one stream (rank1), a quantity of precoding matrices in the first codebook set is $N_1 \cdot N_2 \cdot N_3 \cdot N_4$. Because there are excessive elements, they are not listed one by one herein. For example, $\lceil \log_2(N_1 \cdot N_2 \cdot N_3 \cdot N_4) \rceil$ bits in the DCI indicate the precoding information (corresponding to the TPMI). Relationships between precoding information indicated in the DCI and TPMIs are shown in the following Table 4. In Table 4, the first column indicates precoding information indicated in the DCI, and each row indicates a correspondence between a TPMI and an indicated bit value.

TABLE 4

| Bit field mapped to index (Bit field mapped to index) | TPMI of a first codebook set |
| --- | --- |
| 0 | One layer (layer): TPMI = 0 |
| 1 | One layer (layer): TPMI = 1 |
| 2 | One layer (layer): TPMI = 2 |
| . . . | . . . |
| $N_1$ | One layer (layer): TPMI = $N_1$ |
| $N_1 + 1$ | One layer (layer): TPMI = $N_1 + 1$ |
| . . . | . . . |
| $N_1*N_2$ | One layer (layer): TPMI = $N_1*N_2 - 1$ |
| . . . | . . . |
| $N_1*N_2*N_3*N_4 - 1$ | One layer (layer): TPMI = $N_1*N_2*N_3*N_4 - 1$ |

For example, when the quantity of antenna ports of the terminal device is 8 and the terminal device transmits one stream (rank1), a precoding matrix in the first codebook set satisfies:

$$V_8^{(1)\prime} = A_1 = \frac{1}{\sqrt{p \cdot q}} \left[ \begin{bmatrix} \begin{bmatrix} 1 \\ B \end{bmatrix} \\ \begin{bmatrix} 1 \\ D \end{bmatrix} \cdot \exp(j\ \varphi) \end{bmatrix} \\ \begin{bmatrix} \begin{bmatrix} 1 \\ E \end{bmatrix} \\ \begin{bmatrix} 1 \\ F \end{bmatrix} \cdot \exp(j\ \theta) \end{bmatrix} \cdot \exp(j\ \delta) \right]. \quad (9)$$

$V_8^{(1)\prime}$ represents the precoding matrix in the first codebook set, and meanings of parameters in Formula (9) are the same as the meanings of the parameters in Formula (8). The first codebook set may be obtained by the terminal device by substituting different values of θ, φ, and δ into Formula (9). To be specific, one group of values of θ, φ, and δ corresponds to one precoding matrix in the first codebook set. Formula (9) may be considered as a formula for generating the first codebook set. Formula (9) includes three parameters: θ, φ, and δ, and all or some combinations of values of θ, values of φ, and values of δ correspond to one phase set. Any group of phase values in the phase set may be substituted into Formula (9) to obtain a precoding matrix in the first codebook set. A main difference between Formula (9) and Formula (8) is that a phase ε is replaced with a phase θ, and codebook configuration information used by the terminal device to generate the first codebook set does not need to additionally indicate the phase ε, and only needs to indicate phases θ, φ, and δ. In addition, a value of $N_3$ does not need to be indicated.

When the quantity of antenna ports of the terminal device is 8 and the terminal device transmits one stream (rank1), a quantity of precoding matrices in the first codebook set is $N_1 \cdot N_2 \cdot N_4$. For example, $\lceil \log_2(N_1 \cdot N_2 \cdot N_4) \rceil$ bits in the DCI indicate the precoding information (corresponding to the TPMI index). A mapping relationship between the TPMI index and the precoding matrix when the precoding matrix in the first codebook set satisfies Formula (9) is similar to the mapping relationship between the TPMI index and the precoding matrix when the precoding matrix in the first codebook set satisfies Formula (8).

For example, when the quantity of antenna ports of the terminal device is 8 and the terminal device transmits one stream (rank1), a precoding matrix in the first codebook set satisfies:

$$V_8^{(1)''} = A_1 = \frac{1}{\sqrt{p \cdot q}} \begin{bmatrix} \begin{bmatrix} \begin{bmatrix} 1 \\ B \end{bmatrix} \\ \begin{bmatrix} 1 \\ D \end{bmatrix} \cdot \exp(j\,\varphi) \end{bmatrix} \\ \begin{bmatrix} \begin{bmatrix} 1 \\ E \end{bmatrix} \\ \begin{bmatrix} 1 \\ F \end{bmatrix} \cdot \exp(j\,\varphi) \end{bmatrix} \cdot \exp(j\,\delta) \end{bmatrix}. \quad (10)$$

$v_8^{(1)''}$ represents the precoding matrix in the first codebook set, and meanings of parameters in Formula (10) are the same as the meanings of the parameters in Formula (8). The first codebook set may be obtained by the terminal device by substituting different values of θ, φ, and δ into Formula (10). To be specific, one group of values of θ, φ, and δ corresponds to one precoding matrix in the first codebook set. Formula (10) may be considered as a formula for generating the first codebook set. Formula (10) includes three parameters: θ, φ, and δ, and all or some combinations of values of θ, values of φ, and values of δ correspond to one phase set. Any group of phase values in the phase set may be substituted into Formula (10) to obtain a precoding matrix in the first codebook set. A main difference between Formula (10) and Formula (8) is that a phase ε is replaced with a phase φ, and codebook configuration information used by the terminal device to generate the first codebook set does not need to additionally indicate the phase ε, and only needs to indicate phases θ, φ, and δ. In addition, a value of $N_3$ does not need to be indicated.

When the quantity of antenna ports of the terminal device is 8 and the terminal device transmits one stream (rank1), a quantity of precoding matrices in the first codebook set is $N_1 \cdot N_2 \cdot N_4$. For example, $\lceil \log_2(N_1 \cdot N_2 \cdot N_4) \rceil$ bits in the DCI indicate the precoding information (corresponding to the TPMI). A mapping relationship between the TPMI index and the precoding matrix when the precoding matrix in the first codebook set satisfies Formula (10) is similar to the mapping relationship between the TPMI index and the precoding matrix when the precoding matrix in the first codebook set satisfies Formula (8).

For example, when the quantity of antenna ports of the terminal device is 8 and the terminal device transmits two streams (rank2), a precoding matrix in the first codebook set satisfies:

$$V_8^{(2)} = \frac{1}{\sqrt{p \cdot q}} \begin{bmatrix} \begin{bmatrix} \begin{bmatrix} 1 \\ B \end{bmatrix} \\ \begin{bmatrix} 1 \\ D \end{bmatrix} \cdot \exp(j\,\varphi) \end{bmatrix} & \begin{bmatrix} \begin{bmatrix} 1 \\ B \end{bmatrix} \\ \begin{bmatrix} 1 \\ D \end{bmatrix} \cdot \exp(j\,\varphi) \end{bmatrix} \\ \begin{bmatrix} \begin{bmatrix} 1 \\ E \end{bmatrix} \\ \begin{bmatrix} 1 \\ F \end{bmatrix} \cdot \exp(j\,\varepsilon) \end{bmatrix} \cdot \exp(j\,\delta) & -\begin{bmatrix} \begin{bmatrix} 1 \\ E \end{bmatrix} \\ \begin{bmatrix} 1 \\ F \end{bmatrix} \cdot \exp(j\,\varepsilon) \end{bmatrix} \cdot \exp(j\,\delta) \end{bmatrix}. \quad (11)$$

$v_8^{(2)}$ represents the precoding matrix in the first codebook set, and meanings of parameters in Formula (11) are the same as the meanings of the parameters in Formula (8). Formula (11) may be considered as a formula for generating the first codebook set.

For example, when the quantity of antenna ports of the terminal device is 8 and the terminal device transmits two streams (rank2), a precoding matrix in the first codebook set satisfies:

$$V_8^{(2)} = \frac{1}{\sqrt{p \cdot q}} \cdot \begin{bmatrix} \begin{bmatrix} \begin{bmatrix} 1 \\ B \end{bmatrix} \\ \begin{bmatrix} 1 \\ D \end{bmatrix} \cdot \exp(j\,\varphi) \end{bmatrix} & \begin{bmatrix} \begin{bmatrix} 1 \\ B \end{bmatrix} \\ -\begin{bmatrix} 1 \\ D \end{bmatrix} \cdot \exp(j\,\varphi) \end{bmatrix} \\ \begin{bmatrix} \begin{bmatrix} 1 \\ E \end{bmatrix} \\ \begin{bmatrix} 1 \\ F \end{bmatrix} \cdot \exp(j\,\varepsilon) \end{bmatrix} \cdot \exp(j\,\delta) & \begin{bmatrix} \begin{bmatrix} 1 \\ E \end{bmatrix} \\ -\begin{bmatrix} 1 \\ F \end{bmatrix} \cdot \exp(j\,\varepsilon) \end{bmatrix} \cdot \exp(j\,\delta) \end{bmatrix}. \quad (12)$$

$v_8^{(2)}$ represents the precoding matrix in the first codebook set, and meanings of parameters in Formula (12) are the same as the meanings of the parameters in Formula (8). Formula (12) may be considered as a formula for generating the first codebook set.

A mapping relationship between the TPMI index and the precoding matrix when the quantity of antenna ports is 8 and the maximum rank is 2 is similar to a mapping relationship between the TPMI index and the precoding matrix when the quantity of antenna ports is 8 and the maximum rank is 1. When the quantity of antenna ports is 8 and the maximum rank is 2, indexes corresponding to $N_1 \cdot N_2 \cdot N_3 \cdot N_4$ precoding matrices included in the first codebook set are 0, 1, 2, . . . , and $N_1 \cdot N_2 \cdot N_3 \cdot N_4 - 1$. For example, when the TPMI (corresponding to the first precoding indication information) is indicated in the DCI, TPMIs including stream 1 (rank1) and stream 2 (rank2) occupies $\lceil \log_2(2 \cdot N_1 \cdot N_2 \cdot N_3 \cdot N_4) \rceil$ bits.

For example, when the quantity of antenna ports of the terminal device is 8 and the terminal device transmits three streams (rank3), a precoding matrix in the first codebook set satisfies:

$$V_8^{(3)} = \frac{1}{\sqrt{p \cdot q}} \cdot A_3 = \frac{1}{\sqrt{p \cdot q}} \cdot \begin{bmatrix} A_{21} & \begin{bmatrix} \begin{bmatrix} 1 \\ -B \end{bmatrix} \\ \begin{bmatrix} 1 \\ -D \end{bmatrix} \cdot \exp(j\ \varphi) \\ \begin{bmatrix} 1 \\ -E \end{bmatrix} \\ \begin{bmatrix} 1 \\ -F \end{bmatrix} \cdot \exp(j\ \varepsilon) \end{bmatrix} \cdot \exp(j\ \delta) & A_{22} \end{bmatrix}. \quad (13)$$

$V_8^{(3)}$ represents the precoding matrix in the first codebook set, $$A_{21} = \begin{bmatrix} \begin{bmatrix} 1 \\ B \end{bmatrix} \\ \begin{bmatrix} 1 \\ D \end{bmatrix} \cdot \exp(j\ \varphi) \\ \begin{bmatrix} 1 \\ E \end{bmatrix} \\ \begin{bmatrix} 1 \\ F \end{bmatrix} \cdot \exp(j\ \varepsilon) \end{bmatrix} \cdot \exp(j\ \delta) \end{bmatrix}, A_{22} = \begin{bmatrix} \begin{bmatrix} 1 \\ B \end{bmatrix} \\ \begin{bmatrix} 1 \\ D \end{bmatrix} \cdot \exp(j\ \varphi) \\ -\begin{bmatrix} 1 \\ E \end{bmatrix} \\ \begin{bmatrix} 1 \\ F \end{bmatrix} \cdot \exp(j\ \varepsilon) \end{bmatrix} \cdot \exp(j\ \delta) \end{bmatrix},$$

and meanings of parameters in Formula (13) are the same as the meanings of the parameters in Formula (8).

For example, when the quantity of antenna ports of the terminal device is 8 and the terminal device transmits three streams (rank3), a precoding matrix in the first codebook set satisfies:

$$V_8^{(3)} = \frac{1}{\sqrt{p \cdot q}} \cdot A_3 = \frac{1}{\sqrt{p \cdot q}} \cdot \begin{bmatrix} A_{21} & \begin{bmatrix} \begin{bmatrix} 1 \\ B \end{bmatrix} \\ -\begin{bmatrix} 1 \\ D \end{bmatrix} \cdot \exp(j\ \varphi) \\ \begin{bmatrix} 1 \\ E \end{bmatrix} \\ -\begin{bmatrix} 1 \\ F \end{bmatrix} \cdot \exp(j\ \varepsilon) \end{bmatrix} \cdot \exp(j\ \delta) & A_{22} \end{bmatrix}. \quad (14)$$

$V_8^{(3)}$ represents the precoding matrix in the first codebook set, and meanings of parameters in Formula (14) are the same as the meanings of the parameters in Formula (13).

A mapping relationship between the TPMI index and the precoding matrix when the quantity of antenna ports is 8 and the maximum rank is 3 is similar to a mapping relationship between the TPMI index and the precoding matrix when the quantity of antenna ports is 8 and the maximum rank is 1. When the quantity of antenna ports is 8 and the maximum rank is 3, indexes corresponding to $N_1 \cdot N_2 \cdot N_3 \cdot N_4$ precoding matrices included in the first codebook set are 0, 1, 2, ..., and $N_1 \cdot N_2 \cdot N_3 \cdot N_4 - 1$. For example, when the TPMI (corresponding to the first precoding indication information) is indicated in the DCI, TPMIs including stream 1 (rank1), stream 2 (rank2), and stream 3 (rank3) occupies $\lceil \log_2(3 \cdot N_1 \cdot N_2 \cdot N_3 \cdot N_4) \rceil$ bits.

For example, when the quantity of antenna ports of the terminal device is 8 and the terminal device transmits four streams (rank4), a precoding matrix in the first codebook set satisfies:

$$V_8^{(4)} = \frac{1}{\sqrt{p \cdot q}} \cdot \begin{bmatrix} \begin{bmatrix} \begin{bmatrix} 1 \\ B \end{bmatrix} \\ \begin{bmatrix} 1 \\ D \end{bmatrix} \cdot \exp(j\ \varphi) \\ \begin{bmatrix} 1 \\ E \end{bmatrix} \\ \begin{bmatrix} 1 \\ F \end{bmatrix} \cdot \exp(j\ \varepsilon) \end{bmatrix} \cdot \exp(j\ \delta) & \begin{bmatrix} \begin{bmatrix} 1 \\ B \end{bmatrix} \\ -\begin{bmatrix} 1 \\ D \end{bmatrix} \cdot \exp(j\ \varphi) \\ \begin{bmatrix} 1 \\ E \end{bmatrix} \\ -\begin{bmatrix} 1 \\ F \end{bmatrix} \cdot \exp(j\ \varphi) \end{bmatrix} \cdot \exp(j\ \delta) \\ \begin{bmatrix} \begin{bmatrix} 1 \\ B \end{bmatrix} \\ \begin{bmatrix} 1 \\ D \end{bmatrix} \cdot \exp(j\ \varphi) \\ -\begin{bmatrix} 1 \\ E \end{bmatrix} \\ -\begin{bmatrix} 1 \\ F \end{bmatrix} \cdot \exp(j\ \varepsilon) \end{bmatrix} \cdot \exp(j\ \varepsilon) & \begin{bmatrix} \begin{bmatrix} 1 \\ B \end{bmatrix} \\ -\begin{bmatrix} 1 \\ D \end{bmatrix} \cdot \exp(j\ \varphi) \\ -\begin{bmatrix} 1 \\ E \end{bmatrix} \\ \begin{bmatrix} 1 \\ F \end{bmatrix} \cdot \exp(j\ \varphi) \end{bmatrix} \cdot \exp(j\ \delta) \end{bmatrix}. \quad (15)$$

$V_8^{(4)}$ represents the precoding matrix in the first codebook set, $V_8^{(4)}$ corresponds to Formula (15), and meanings of parameters in Formula (15) are the same as the meanings of the parameters in Formula (8). Formula (15) may be considered as a formula for generating the first codebook set (corresponding to rank4).

A mapping relationship between the TPMI index and the precoding matrix when the quantity of antenna ports is 8 and the maximum rank is 4 is similar to a mapping relationship between the TPMI index and the precoding matrix when the quantity of antenna ports is 8 and the maximum rank is 1. When the quantity of antenna ports is 8 and the maximum rank is 4, indexes corresponding to $N_1 \cdot N_2 \cdot N_3 \cdot N_4$ precoding matrices included in the first codebook set are 0, 1, 2, ..., and $N_1 \cdot N_2 \cdot N_3 \cdot N_4 - 1$. For example, when the TPMI (corresponding to the first precoding indication information) is indicated in the DCI, TPMIs including stream 1 (rank1), stream 2 (rank2), stream 3 (rank3), and stream 4 (rank4) occupies $\lceil \log_2(4 \cdot N_1 \cdot N_2 \cdot N_3 \cdot N_4) \rceil$ bits.

For example, when the quantity of antenna ports of the terminal device is 8 and the terminal device transmits five streams (rank5), a precoding matrix in the first codebook set satisfies:

$$V_8^{(5)} = \frac{1}{\sqrt{p \cdot q}} \cdot \begin{bmatrix} A_4 & \begin{bmatrix} \begin{bmatrix} 1 \\ -B \end{bmatrix} \\ \begin{bmatrix} 1 \\ -D \end{bmatrix} \cdot \exp(j\ \varphi) \\ \begin{bmatrix} 1 \\ -E \end{bmatrix} \\ \begin{bmatrix} 1 \\ -F \end{bmatrix} \cdot \exp(j\ \varepsilon) \end{bmatrix} \cdot \exp(j\ \delta) \end{bmatrix}. \quad (16)$$

$V_8^{(5)}$ represents the precoding matrix in the first codebook set, $A_4 = V_8^{(4)}$, and meanings of parameters in Formula (16) are the same as the meanings of the parameters in Formula (8).

A mapping relationship between the TPMI index and the precoding matrix when the quantity of antenna ports is 8 and the maximum rank is 5 is similar to a mapping relationship between the TPMI index and the precoding matrix when the quantity of antenna ports is 8 and the maximum rank is 1. When the quantity of antenna ports is 8 and the maximum rank is 5, indexes corresponding to $N_1 \cdot N_2 \cdot N_3 \cdot N_4$ precoding matrices included in the first codebook set are 0, 1, 2, ..., and $N_1 \cdot N_2 \cdot N_3 \cdot N_4 - 1$. For example, when the TPMI (corresponding to the first precoding indication information) is indicated in the DCI, TPMIs including stream 1 (rank1), stream 2 (rank2), stream 3 (rank3), stream 4 (rank4), and stream 5 (rank5) occupies $\lceil \log_2(5 \cdot N_1 \cdot N_2 \cdot N_3 \cdot N_4) \rceil$ bits.

For example, when the quantity of antenna ports of the terminal device is 8 and the terminal device transmits six streams (rank6), a precoding matrix in the first codebook set satisfies:

$$V_8^{(6)} = \frac{1}{\sqrt{p \cdot q}} \cdot \left[ A_4 \begin{bmatrix} \begin{bmatrix} \begin{bmatrix} 1 \\ -B \end{bmatrix} \\ \begin{bmatrix} 1 \\ -D \end{bmatrix} \cdot \exp(j\,\varphi) \\ \begin{bmatrix} 1 \\ -E \end{bmatrix} \\ \begin{bmatrix} 1 \\ -F \end{bmatrix} \cdot \exp(j\,\varepsilon) \end{bmatrix} \cdot \exp(j\,\delta) \begin{bmatrix} \begin{bmatrix} 1 \\ -B \end{bmatrix} \\ \begin{bmatrix} 1 \\ -D \end{bmatrix} \cdot \exp(j\,\varphi) \\ \begin{bmatrix} -1 \\ E \end{bmatrix} \\ \begin{bmatrix} -1 \\ F \end{bmatrix} \cdot \exp(j\,\varepsilon) \end{bmatrix} \cdot \exp(j\,\delta) \end{bmatrix} \right].$$ (17)

$v_8^{(6)}$ represents the precoding matrix in the first codebook set, $v_8^{(6)}$ corresponds to Formula (17), and meanings of parameters in Formula (17) other than $A_4$ are the same as the meanings of the parameters in Formula (8). $A_4$ in Formula (17) is the same as $A_4$ in Formula (16).

A mapping relationship between the TPMI index and the precoding matrix when the quantity of antenna ports is 8 and the maximum rank is 6 is similar to a mapping relationship between the TPMI index and the precoding matrix when the quantity of antenna ports is 8 and the maximum rank is 1. When the quantity of antenna ports is 8 and the maximum rank is 6, indexes corresponding to $N_1 \cdot N_2 \cdot N_3 \cdot N_4$ precoding matrices included in the first codebook set are 0, 1, 2, ..., and $N_1 \cdot N_2 \cdot N_3 \cdot N_4 - 1$. For example, when the TPMI (corresponding to the first precoding indication information) is indicated in the DCI, TPMIs including stream 1 (rank1), stream 2 (rank2), stream 3 (rank3), stream 4 (rank4), stream 5 (rank5), and stream 6 (rank6) occupies $\lceil \log_2(6 \cdot N_1 \cdot N_2 \cdot N_3 \cdot N_4) \rceil$ bits.

For example, when the quantity of antenna ports of the terminal device is 8 and the terminal device transmits seven streams (rank7), a precoding matrix in the first codebook set satisfies:

$$V_8^{(7)} = \frac{1}{\sqrt{p \cdot q}} \cdot \left[ A_6 \begin{bmatrix} \begin{bmatrix} 1 \\ -B \end{bmatrix} \\ \begin{bmatrix} -1 \\ D \end{bmatrix} \cdot \exp(j\,\varphi) \\ \begin{bmatrix} 1 \\ -E \end{bmatrix} \\ \begin{bmatrix} -1 \\ F \end{bmatrix} \cdot \exp(j\,\varepsilon) \end{bmatrix} \cdot \exp(j\,\delta) \right].$$ (18)

$$A_6 = \cdot \left[ A_4 \begin{bmatrix} \begin{bmatrix} 1 \\ -B \end{bmatrix} \\ \begin{bmatrix} -1 \\ D \end{bmatrix} \cdot \exp(j\,\varphi) \\ \begin{bmatrix} 1 \\ -E \end{bmatrix} \\ \begin{bmatrix} -1 \\ F \end{bmatrix} \cdot \exp(j\,\varepsilon) \end{bmatrix} \cdot \exp(j\,\delta) \begin{bmatrix} \begin{bmatrix} 1 \\ -B \end{bmatrix} \\ \begin{bmatrix} 1 \\ -D \end{bmatrix} \cdot \exp(j\,\phi) \\ \begin{bmatrix} -1 \\ E \end{bmatrix} \\ \begin{bmatrix} -1 \\ F \end{bmatrix} \cdot \exp(j\,\varepsilon) \end{bmatrix} \cdot \exp(j\,\delta) \right], V_8^{(7)}$$

represents the precoding matrix in the first codebook set, $A_4 = v_8^{(4)}$, and meanings of parameters in Formula (18) other than $A_6$ are the same as the meanings of the parameters in Formula (8).

A mapping relationship between the TPMI index and the precoding matrix when the quantity of antenna ports is 8 and the maximum rank is 7 is similar to a mapping relationship between the TPMI index and the precoding matrix when the quantity of antenna ports is 8 and the maximum rank is 1. When the quantity of antenna ports is 8 and the maximum rank is 7, indexes corresponding to $N_1 \cdot N_2 \cdot N_3 \cdot N_4$ precoding matrices included in the first codebook set are 0, 1, 2, ..., and $N_1 \cdot N_2 \cdot N_3 \cdot N_4 - 1$. For example, when the TPMI (corresponding to the first precoding indication information) is indicated in the DCI, TPMIs including stream 1 (rank1), stream 2 (rank2), stream 3 (rank3), stream 4 (rank4), stream 5 (rank5), stream 6 (rank6), and stream 7 (rank7) occupies $\lceil \log_2(7 \cdot N_1 \cdot N_2 \cdot N_3 \cdot N_4) \rceil$ bits.

For example, when the quantity of antenna ports of the terminal device is 8 and the terminal device transmits eight streams (rank8), a precoding matrix in the first codebook set satisfies:

$$V_8^{(8)} = \frac{1}{\sqrt{p \cdot q}} \cdot \left[ A_6 \begin{bmatrix} \begin{bmatrix} 1 \\ -B \end{bmatrix} \\ \begin{bmatrix} -1 \\ D \end{bmatrix} \cdot \exp(j\,\varphi) \\ \begin{bmatrix} 1 \\ -E \end{bmatrix} \\ \begin{bmatrix} -1 \\ F \end{bmatrix} \cdot \exp(j\,\varepsilon) \end{bmatrix} \cdot \exp(j\,\delta) \begin{bmatrix} \begin{bmatrix} 1 \\ -B \end{bmatrix} \\ \begin{bmatrix} 1 \\ -D \end{bmatrix} \cdot \exp(j\,\varphi) \\ \begin{bmatrix} -1 \\ E \end{bmatrix} \\ \begin{bmatrix} -1 \\ F \end{bmatrix} \cdot \exp(j\,\varepsilon) \end{bmatrix} \cdot \exp(j\,\delta) \right].$$ (19)

$v_8^{(8)}$ represents the precoding matrix in the first codebook set, $A_6$ is the same as $A_6$ in Formula (18), and meanings of parameters in Formula (19) other than $A_6$ are the same as the meanings of the parameters in Formula (8).

A mapping relationship between the TPMI index and the precoding matrix when the quantity of antenna ports is 8 and the maximum rank is 8 is similar to a mapping relationship between the TPMI index and the precoding matrix when the quantity of antenna ports is 8 and the maximum rank is 1. When the quantity of antenna ports is 8 and the maximum rank is 8, indexes corresponding to $N_1 \cdot N_2 \cdot N_3 \cdot N_4$ precoding matrices included in the first codebook set are 0, 1, 2, ..., and $N_1 \cdot N_2 \cdot N_3 \cdot N_4 - 1$. For example, when the TPMI (corresponding to the first precoding indication information) is indicated in the DCI, TPMIs including stream 1 (rank1), stream 2 (rank2), stream 3 (rank3), stream 4 (rank4), stream 5 (rank5), stream 6 (rank6), stream 7 (rank7), and stream 8 (rank8) occupies $\lceil \log_2(8 \cdot N_1 \cdot N_2 \cdot N_3 \cdot N_4) \rceil$ bits.

FIG. 5 describes a method for a terminal device to determine a precoding matrix, but does not describe an interaction procedure between a network device and the terminal device. The following describes, with reference to accompanying drawings, the interaction procedure between the network device and the terminal device in a process in which the terminal device determines the precoding matrix.

Figure 9:
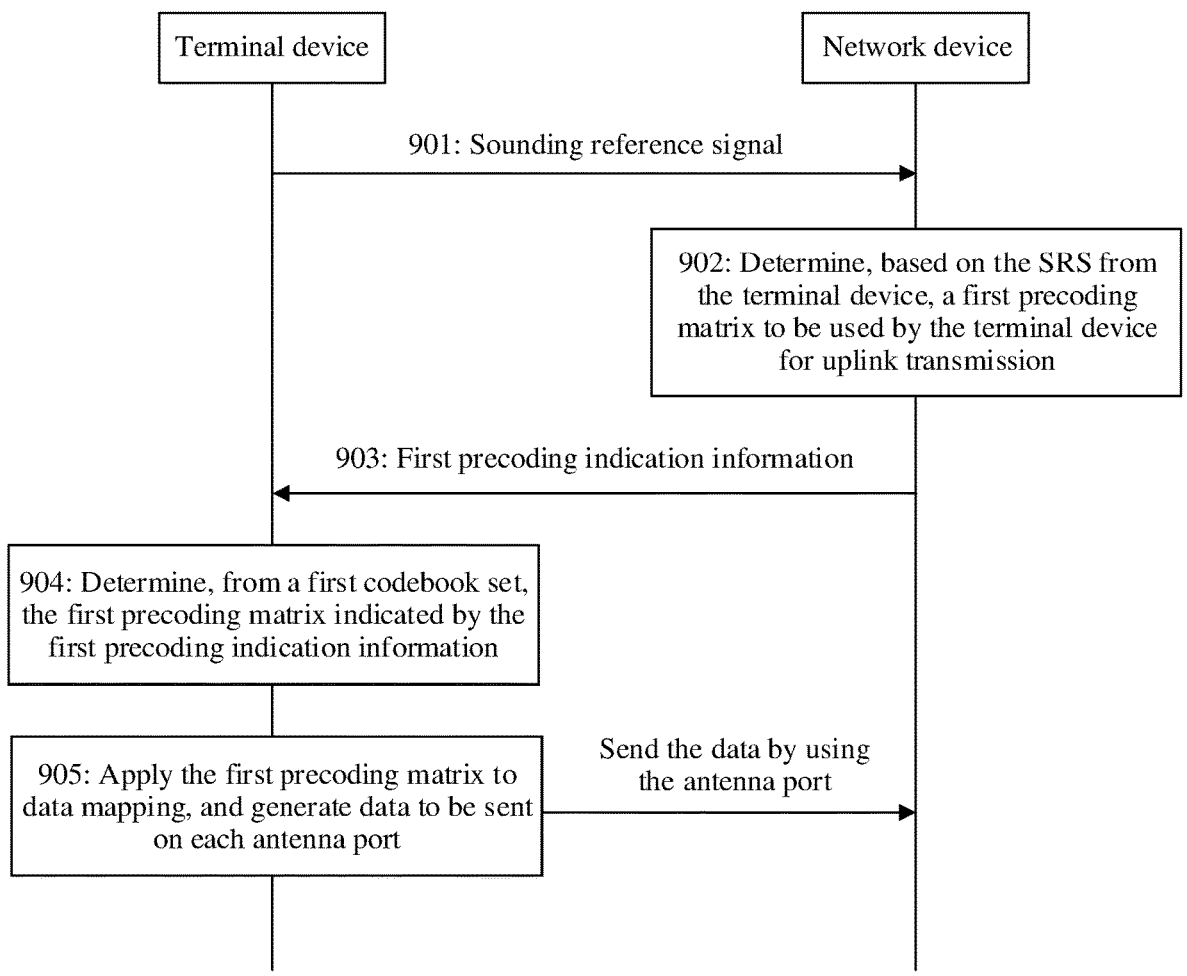
FIG. 9 is a flowchart of another precoding matrix determining method according to an embodiment of this application.

FIG. 9 is a flowchart of another precoding matrix determining method according to an embodiment of this application. The method may be applied to the communication system shown in FIG. 1. As shown in FIG. 9, the method includes the following steps.

901: A terminal device sends reference signal to a network device.

In some embodiments, before performing step 901, the terminal device may perform the following operations: receiving codebook configuration information from the network device; determining a phase set based on the codebook configuration information, where the phase set includes at least one phase value; and generating a first codebook set based on the phase set, where any phase value in the phase set corresponds to a precoding matrix in the first codebook set.

902: The network device determines, based on an SRS from the terminal device, a first precoding matrix to be used by the terminal device for uplink transmission.

The first precoding matrix is a precoding matrix in the first codebook set, and the network device stores the first codebook set. The network device may obtain uplink channel information of the terminal device based on the SRS from the terminal device; select, from the first codebook set, a precoding matrix most suitable for a current channel; and then determine an index, namely, a TPMI index, of the precoding matrix in the first codebook set. For example, the network device traverses precoding matrices corresponding to all TPMI indexes in the first codebook set, to ensure that the selected precoding matrix can maximize a capacity.

Codebook selection for transmitting one layer (rank=1) is used as an example. It is assumed that power of a user k (corresponding to a terminal device) on an $m^{th}$ subcarrier is $p_{k,m}$, and a signal to interference plus noise ratio (Signal to Interference plus Noise Ratio, SINR) on the $m^{th}$ subcarrier is $\gamma_{k,m}$. A channel matrix on the $m^{th}$ subcarrier of the user k is $H_{k,m}$ (namely, a matrix of a channel from the user to a base station). The SINR is defined as:

$$\gamma_{k,m} = \frac{p_{k,m} \cdot |g_{k,m} H_{k,m} w_k|^2}{|g_{k,m}(I_{k,m} + \sigma^2)|^2}. \quad (20)$$

$g_{k,m}$ is a weight coefficient on a receive antenna of the base station, $w_k$ is a precoding matrix of the user k, $I_{k,m}$ is an inter-cell interference covariance matrix, and $\sigma^2$ is noise power. For example, $g_{k,m}$ is solved by using a method of matched filtering, and $g_{k,m}=(H_{k,m}w_k)^H$ may be obtained. Certainly, $g_{k,m}$ may also be solved by using a method of minimum mean square error. For example, the precoding matrix is obtained by using a capacity maximization criterion:

$$\arg\max_{\{w_k\}} \left\{ \sum_{m=1}^{M} f(\gamma_{k,m}) \right\}. \quad (21)$$

s.t. $w_k \in \Phi$ $\Phi$ is a codebook set, M is a total quantity of subcarriers, and $f(\cdot)$ is a function. For example, an implementation may be represented as $f(\gamma_{k,m}=\log_2(1+\gamma_{k,m})$. For wideband precoding, it is assumed that same precoding is used on all subcarriers. Therefore, $w_k$ is irrelevant to a scheduling resource block index. For subband precoding, same precoding is used on all subcarriers in a subband. In this case, M is a quantity of subcarriers included in a subband. The precoding matrix $w_k$ may be obtained by using Formula (21), and the TPMI may be determined according to a rule of numbering elements in the codebook set.

903: The network device sends first precoding indication information to the terminal device.

For example, the first precoding indication information is DCI, and the first precoding indication information indicates the first precoding matrix. Optionally, a TPMI index carried in the first precoding indication information indicates the first precoding matrix. Corresponding to an operation of sending the first precoding indication information by the network device, the terminal device receives the first precoding indication information.

904: The terminal device determines, from the first codebook set, the first precoding matrix indicated by the first precoding indication information.

An implementation of step 904 may be the same as an implementation of step 502.

905: The terminal device applies the first precoding matrix to data mapping, generates data to be sent on each antenna port, and sends the data by using the antenna port.

In this embodiment of this application, the network device determines, from a codebook set with high precision, the precoding matrix to be used by the terminal device for uplink transmission, and the terminal device performs uplink transmission by using the precoding matrix with high precision, so that an uplink capacity can be increased.

The foregoing describes a method procedure in which the terminal device performs uplink transmission by using the first codebook set with high precision. The following describes a method procedure in which the terminal device generates the first codebook set.

Figure 10:
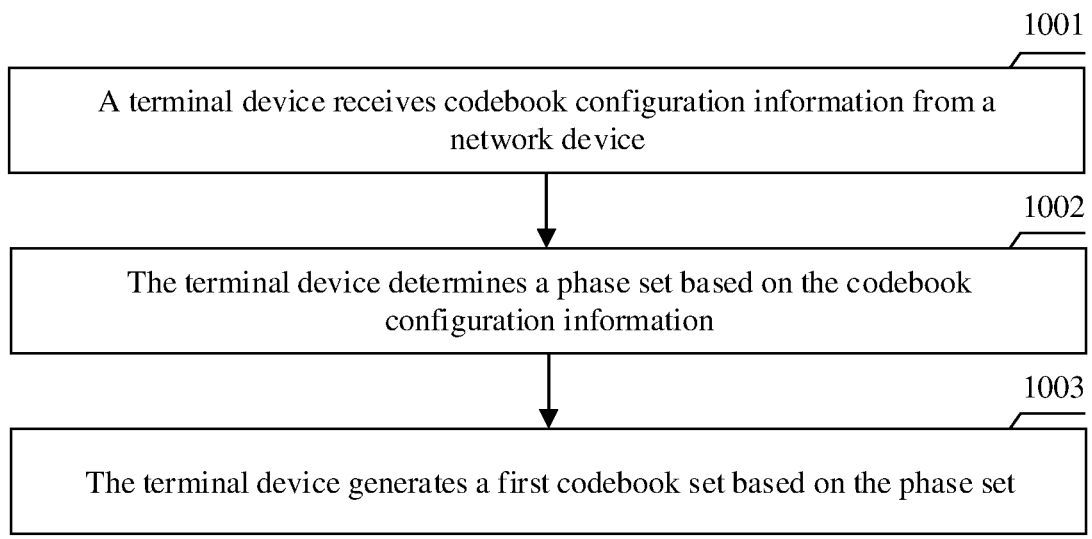
FIG. 10 is a flowchart of a codebook generation method according to an embodiment of this application.

FIG. 10 is a flowchart of a codebook generation method according to an embodiment of this application. The method may be applied to the communication system shown in FIG. 1. The method includes the following steps.

1001: A terminal device receives codebook configuration information from a network device.

The codebook configuration information includes at least one quantized phase value (which may also be referred to as a phase quantized factor). Optionally, the terminal device may further report a quantity of antenna ports of the terminal device to the network device. For example, the terminal device reports the quantity of antenna ports when accessing the network device. The network device may configure a corresponding phase quantized factor based on a quantity of uplink antenna ports of the terminal device. When the quantity of antenna ports of the terminal device is 2, the codebook configuration information at least configures a value of $N_1$. When a quantity of transmit antenna ports of the terminal device is 4, the codebook configuration information at least configures values of $N_1$ and $N_2$. When the quantity of transmit antenna ports of the terminal device is 8, the codebook configuration information at least configures values of $N_1$, $N_2$, $N_3$, and $N_4$.

In some embodiments, the uplink codebook-based transmission mode is indicated in an RRC signaling PUSCH-Config information element (Information element, IE). A method for indicating the quantized phase value is to add indication content "phaseQuantizationFactorforCodebook" to PUSCH-Config, as shown below. phaseFactor1 indicates a value of $N_1$, phaseFactor2 indicates a value of $N_2$, phaseFactor3 indicates a value of $N_3$, and phaseFactor4 indicates a value of $N_4$. It should be noted that PUSCH-Config is a UE-specific configuration. In other words, this parameter is configured for each terminal device. Values of parameters $N_1$, $N_2$, $N_3$, and $N_4$ may be 2, 4, 6, 8, or other values. In actual configuration, only one value is selected. For example, when phaseFactor1 is set to 4, the value of $N_1$ is 4. That is, phases between 0 and 2/c are equally divided into four parts.

```
PUSCH-Config information element
-- ASN1START
-- TAG-PUSCH-CONFIG-START
PUSCH-Config ::=         SEQUENCE {
    dataScramblingIdentityPUSCH         INTEGER    (0..1023)
OPTIONAL, -- Need S
    txConfig       ENUMERATED {codebook, nonCodebook} OPTIONAL, --
Need S
  phaseQuantizationFactorforCodebook   SEQUENCE {
  phaseFactor1 ENUMERATED{N_1,N_2,N_3,N_4}
  phaseFactor2 ENUMERATED{N_1,N_2,N_3,N_4}
  phaseFactor3 ENUMERATED{N_1,N_2,N_3,N_4}
  phaseFactor4 ENUMERATED{N_1,N_2,N_3,N_4}
  }
}
```

1002: The terminal device determines a phase set based on the codebook configuration information.

The phase set includes at least one phase value. Optionally, the codebook configuration information includes a quantized phase value $N_1$. A possible implementation of step 1002 is as follows: The terminal device determines a phase set $$\left\{0, \frac{2\pi}{N_1}, \frac{2\pi \times 2}{N_1}, \ldots, \frac{(N_1-1) \cdot 2\pi}{N_1}\right\}$$

based on the quantized phase value $N_1$, corresponding to $$\theta = 0 : \frac{2\pi}{N_1} : \frac{(N_1-1) \cdot 2\pi}{N_1}.$$

Optionally, the codebook configuration information includes quantized phase values $N_1$ and $N_2$. A possible implementation of step 1002 is as follows: The terminal device determines a phase set $$\left\{(0,0), \left(0, \frac{2\pi}{N_2}\right), \ldots, \left(0, \frac{(N_2-1) \cdot 2\pi}{N_2}\right), \left(\frac{2\pi}{N_1}, 0\right), \left(\frac{2\pi}{N_1}, \frac{2\pi}{N_2}\right), \ldots, \left(\frac{(N_1-1) \cdot 2\pi}{N_1}, \frac{(N_2-1) \cdot 2\pi}{N_2}\right)\right\}$$

based on the quantized phase values $N_1$ and $N_2$, corresponding to a combination of $$\theta = 0 : \frac{2\pi}{N_1} : \frac{(N_1-1) \cdot 2\pi}{N_1}$$

and $$\varphi = 0 : \frac{2\pi}{N_2} : \frac{(N_2-1) \cdot 2\pi}{N_2}.$$

Optionally, the codebook configuration information includes quantized phase values $$N_1, N_2, N_3, N_4, \theta = 0 : \frac{2\pi}{N_1} : \frac{(N_1-1) \cdot 2\pi}{N_1},$$

$$\varphi = 0 : \frac{2\pi}{N_2} : \frac{(N_2-1) \cdot 2\pi}{N_2},$$

$$\varepsilon = 0 : \frac{2\pi}{N_3} : \frac{(N_3-1) \cdot 2\pi}{N_3}, \delta = 0 : \frac{2\pi}{N_4} : \frac{(N_4-1) \cdot 2\pi}{N_4}.$$

A possible implementation of step 1002 is as follows: The terminal device determines a phase set $\{\theta, \varphi, \varepsilon, \delta\}$ based on the quantized phase values $N_1$, $N_2$, $N_3$, and $N_4$. In the phase set $\{\theta, \varphi, \varepsilon, \delta\}$, $\theta$ has $N_1$ values, $\varphi$ has $N_2$ values, $\varepsilon$ has $N_3$ values, and $\delta$ has $N_4$ values. The phase set has $(N_1 \cdot N_2 \cdot_3 \cdot N_4)$ elements, and each element is a group of phase values. Optionally, the codebook configuration information includes quantized phase values $$N_1, \theta = 0 : \frac{2\pi}{N_1} : \frac{(N_1-1) \cdot 2\pi}{N_1},$$

$$\varphi = 0 : \frac{2\pi}{N_1} : \frac{(N_1-1) \cdot 2\pi}{N_1}, \varepsilon = 0 : \frac{2\pi}{N_1} : \frac{(N_1-1) \cdot 2\pi}{N_1},$$

$$\delta = 0 : \frac{2\pi}{N_1} : \frac{(N_1-1) \cdot 2\pi}{N_1}.$$

A possible implementation of step 1002 is as follows: The terminal device determines a phase set $\{\theta, \varphi, \varepsilon, \delta\}$ based on the quantized phase value $N_1$. In the phase set $\{\theta, \varphi, \varepsilon, \delta\}$, $\theta$ has $N_1$ values, $\varphi$ has $N_1$ values, $\varepsilon$ has N values, and $\delta$ has $N_1$ values. The phase set has $(N_1 \cdot N_1 \cdot N_1 \cdot N_1)$ elements, and each element is a group of phase values. When $N_1$, $N_2$, $N_3$, and $N_4$ are set to different values, phase quantization is complex. In some embodiments, $N_1$, $N_2$, $N_3$, and $N_4$ may be set to a same value, that is, all phases use a same quantization manner. Because $N_1$, $N_2$, $N_3$, and $N_4$ are the same value, when performing configuration by using RRC signaling, the network device needs to configure only one parameter. For example, only $N_1$ is configured in the codebook configuration information. In this way, parameters carried in the codebook configuration information can be reduced, and phase quantization can also be simplified. An example of the PUSCH-Config information element is as follows. A phase quantization factor indicator "phaseQuantizationFactorforCodebook" is added to the RRC signaling PUSCH-ConfigIE, where $N_1$, $N_2$, $N_3$, and $N_4$ are values of $N_1$, and the terminal device may select any one of $N_1$, $N_2$, $N_3$, and $N_4$ as $N_1$.

```
PUSCH-Config information element
ASN1START
-- TAG-PUSCH-CONFIG-START
PUSCH-Config ::=        SEQUENCE {
   dataScramblingIdentityPUSCH        INTEGER   (0..1023)
OPTIONAL, -- Need S
   txConfig      ENUMERATED {codebook, nonCodebook} OPTIONAL, --
Need S
   phaseQuantizationFactorforCodebookENUMERATED{N1,N2,N3,N4}
```

1003: The terminal device generates the first codebook set based on the phase set.

Any phase value in the phase set corresponds to a precoding matrix in the first codebook set. The terminal device may generate the first codebook set based on each phase value or each group of phase values in the phase set. That is, one precoding matrix is generated based on one phase value or one group of phase values. Optionally, the terminal device may substitute each element (corresponding to one phase value or one group of phase values) in the phase set into any one of Formula (2) to Formula (17), to generate the first codebook set. For example, the terminal device separately substitutes phase values in a phase set $$\left\{0, \frac{2\pi}{N_1}, \frac{2\pi \times 2}{N_1}, \ldots, \frac{(N_1 - 1) \cdot 2\pi}{N_1}\right\}$$

into Formula (2), to generate the first codebook set. For another example, the terminal device separately substitutes phase values in a phase set $$\left\{(0, 0), \left(0, \frac{2\pi}{N_2}\right), \ldots, \left(0, \frac{(N_2 - 1) \cdot 2\pi}{N_2}\right), \left(\frac{2\pi}{N_1}, 0\right), \left(\frac{2\pi}{N_1}, \frac{2\pi}{N_2}\right), \ldots, \left(\frac{(N_1 - 1) \cdot 2\pi}{N_1}, \frac{(N_2 - 1) \cdot 2\pi}{N_2}\right)\right\}$$

into Formula (2), to generate the first codebook set.

In some embodiments, the terminal device may further receive codebook configuration update information from the network device, and generate a new codebook set by using the codebook configuration update information. An implementation of generating the new codebook set by using the codebook configuration update information may be similar to an implementation in FIG. 10. For example, the codebook configuration information indicates that $N_1$ is 8 and $N_2$ is 4, and the codebook configuration update information indicates that $N_1$ 8 and $N_2$ is 6. The new codebook set has higher precision. It should be understood that precision of the codebook set is dynamically or semi-statically adjusted by adjusting the codebook configuration information.

It can be learned by comparing Formula (2) and Formula (4) that any precoding matrix in a codebook set corresponding to two antenna ports is a submatrix of at least one precoding matrix in a codebook set corresponding to four antenna ports. In some embodiments, the terminal device may generate the codebook set corresponding to two antenna ports by using Formula (2), and then determine the codebook set corresponding to four antenna ports based on the codebook set corresponding to two antenna ports.

It can be learned by comparing Formula (4) and Formula (8) that any precoding matrix in a codebook set corresponding to four antenna ports is a submatrix of at least one precoding matrix in a codebook set corresponding to eight antenna ports. In some embodiments, after generating the codebook set corresponding to four antenna ports, the terminal device may determine the codebook set corresponding to eight antenna ports based on the codebook set corresponding to four antenna ports.

The network device sends the codebook configuration information to the terminal device to indicate the quantized phase value, and the terminal device may dynamically generate codebook sets of different precision. In addition, the network device may further configure different quantized phase values based on requirements and hardware capabilities of different terminal devices. For the terminal device, the terminal device may use a codebook set that matches a hardware capability and a requirement of the terminal device, so that the hardware capability of the terminal device can be fully utilized, and an uplink capacity can be improved.

In this embodiment of this application, the terminal device generates the first codebook set of high precision based on the codebook configuration information from the network device, and resource overheads are low.

FIG. 5 describes a method procedure in which the terminal device determines the precoding matrix, and FIG. 10 describes a method procedure of generating the precoding matrix (corresponding to the first codebook set). It should be understood that the terminal device may separately perform the method procedure in FIG. 5 and the method procedure in FIG. 10, or may perform the method procedure in FIG. 5 after generating the first codebook set by performing the method procedure in FIG. 10.

It may be understood that the foregoing embodiments have their own emphasis. For an implementation that is not described in detail in one embodiment, refer to another embodiment. Details are not described herein again. Further, embodiments described in this specification may be independent solutions, or may be combined based on internal logic. These solutions all fall within the protection scope of this application. In other words, the foregoing embodiments may be combined with each other. For example, the methods shown in FIG. 5 and FIG. 10 may be combined. For another example, the related methods shown in FIG. 4 and FIG. 9 may be combined. For another example, the methods shown in FIG. 5 and FIG. 9 may also be combined.

The following describes in detail communication apparatuses provided in embodiments of this application.

Figure 11:
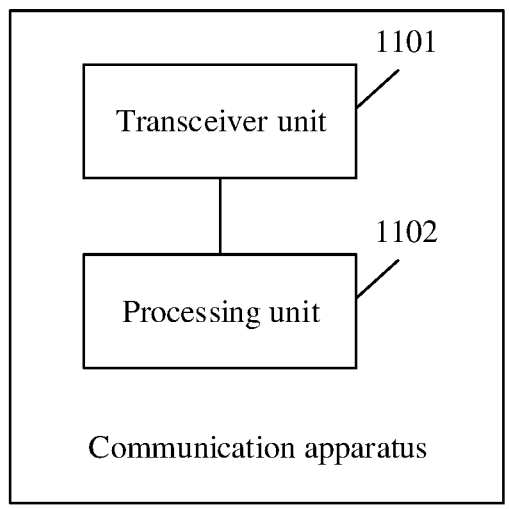
FIG. 11 is a schematic diagram of a structure of a communication apparatus according to an embodiment of this application.

FIG. 11 is a schematic diagram of a structure of a communication apparatus according to an embodiment of this application. The communication apparatus may be configured to perform operations performed by the terminal device in the foregoing method embodiments. For example, the communication apparatus may be configured to perform the method shown in FIG. 5 and/or the method shown in FIG. 10. As shown in FIG. 11, the communication apparatus includes a transceiver unit 1101 and a processing unit 1102.

The transceiver unit 1101 is configured to receive first precoding indication information from a network device.

The processing unit 1102 is configured to: determine, from a first codebook set, a first precoding matrix indicated by the first precoding indication information, where the first precoding matrix is for generating data to be sent on an antenna port of the terminal device, the first codebook set includes the first precoding matrix, a second precoding matrix, and a third precoding matrix, an element at a first position in the first precoding matrix is equal to a value of exponentiation with a first value as an exponent and a natural constant as a base, an element at a first position in the second precoding matrix is equal to a value of exponentiation with a second value as an exponent and a natural constant as a base, an element at a first position in the third precoding matrix is equal to a value of exponentiation with a third value as an exponent and a natural constant as a base, and the first value, the second value, and the third value are different pure imaginary numbers.

In an optional implementation, the transceiver unit 1101 is further configured to receive codebook configuration information from the network device. The processing unit is further configured to: determine a phase set based on the codebook configuration information, where the phase set includes at least one phase value; and generate a first codebook set based on the phase set, where any phase value in the phase set corresponds to a precoding matrix in the first codebook set. Optionally, the processing unit 1102 may further control the transceiver unit 1101 to receive the codebook configuration information.

In an optional implementation, when a quantity of antenna ports is 4, a precoding matrix in the first codebook set satisfies:

$$V_4^{(1)} = \frac{1}{\sqrt{p \cdot q}} \begin{bmatrix} \begin{bmatrix} 1 \\ B \end{bmatrix} \\ \begin{bmatrix} 1 \\ D \end{bmatrix} \cdot \exp(j\,\varphi) \end{bmatrix}. \tag{22}$$

$v_4^{(1)}$ represents the precoding matrix in the first codebook set, the first codebook set is a codebook set used by the terminal device to transmit one stream, $$B, D \in \{\exp(j\,\theta)\}, \theta = 0 : \frac{2\pi}{N_1} : \frac{(N_1-1)\cdot 2\pi}{N_1},$$

$$\varphi = 0 : \frac{2\pi}{N_2} : \frac{(N_2-1)\cdot 2\pi}{N_2},$$

p is a quantity of rows of the precoding matrix, q is a quantity of columns of the precoding matrix, and both $N_1$ and $N_2$ are integers greater than 1.

In an optional implementation, the first codebook set is a codebook set corresponding to four antenna ports, the first codebook set is a codebook set determined by the terminal device based on a second codebook set, the second codebook set is a codebook set corresponding to two antenna ports, and any precoding matrix in the second codebook set is a submatrix of at least one precoding matrix in the first codebook set.

In an optional implementation, when a quantity of antenna ports is 8, a precoding matrix in the first codebook set satisfies:

$$V_8^{(1)} = A_1 = \frac{1}{\sqrt{p \cdot q}} \begin{bmatrix} \begin{bmatrix} \begin{bmatrix} 1 \\ B \end{bmatrix} \\ \begin{bmatrix} 1 \\ D \end{bmatrix} \cdot \exp(j\,\varphi) \end{bmatrix} \\ \begin{bmatrix} \begin{bmatrix} 1 \\ E \end{bmatrix} \\ \begin{bmatrix} 1 \\ F \end{bmatrix} \cdot \exp(j\,\varepsilon) \end{bmatrix} \cdot \exp(j\,\delta) \end{bmatrix}. \tag{23}$$

$v_8^{(1)}$ represents the precoding matrix in the first codebook set, the first codebook set is a codebook set used by the terminal device to transmit one stream, $$B, D, E, F \in \{\exp(j\,\theta)\}, \theta = 0 : \frac{2\pi}{N_1} : \frac{(N_1-1)\cdot 2\pi}{N_1},$$

$$\varphi = 0 : \frac{2\pi}{N_2} : \frac{(N_2-1)\cdot 2\pi}{N_2}, \varepsilon = 0 : \frac{2\pi}{N_3} : \frac{(N_3-1)\cdot 2\pi}{N_3},$$

$$\delta = 0 : \frac{2\pi}{N_4} : \frac{(N_4-1)\cdot 2\pi}{N_4},$$

p is a quantity of rows of the precoding matrix, q is a quantity of columns of the precoding matrix, and $N_1$, $N_2$, $N_3$, and $N_4$ are all integers greater than 1.

In an optional implementation, the first codebook set is a codebook set corresponding to eight antenna ports, the first codebook set is a codebook set determined by the terminal device based on a third codebook set, the third codebook set is a codebook set corresponding to four antenna ports or a codebook set corresponding to two antenna ports, and any precoding matrix in the third codebook set is a submatrix of at least one precoding matrix in the first codebook set.

In an optional implementation, the codebook configuration information includes a quantized phase value, the quantized phase value is for determining the phase set, and the quantized phase value is positively correlated with precision of the first codebook set.

It may be understood that the methods performed by the foregoing units are merely examples. For specific steps performed by the units, refer to the methods described above.

It should be understood that when the communication apparatus is a terminal device or a component that implements the foregoing functions in a terminal device, the processing unit 1102 may be one or more processors, and the transceiver unit 1101 may be a transceiver; or the transceiver unit 1101 may be a sending unit and a receiving unit, the sending unit may be a transmitter, the receiving unit may be a receiver, and the sending unit and the receiving unit are integrated into one component, for example, a transceiver.

When the communication apparatus is a circuit system such as a chip, the processing unit 1102 may be one or more processors, and the transceiver unit 1101 may be an input/ output interface, also referred to as a communication interface, an interface circuit, an interface, or the like. Alternatively, the transceiver unit 1101 may be a sending unit and a receiving unit. The sending unit may be an output interface, and the receiving unit may be an input interface. The sending unit and the receiving unit are integrated into one unit, for example, an input/output interface.

The communication apparatus in this embodiment of this application may perform any function performed by the terminal device in the foregoing method embodiments. For specific steps and/or functions that may be performed, refer to detailed descriptions in the foregoing method embodiments. Only brief descriptions are provided herein, and details are not described again.

FIG. 11 is reused. FIG. 11 is a schematic diagram of a structure of a communication apparatus according to an embodiment of this application. The communication apparatus may be configured to perform operations performed by the network device in the foregoing method embodiments. For example, the communication apparatus may be configured to perform the method performed by the network device in FIG. 9. As shown in FIG. 11, the communication apparatus includes a transceiver unit 1101 and a processing unit 1102.

The processing unit 1102 is configured to: determine, from a first codebook set, a first precoding matrix to be used by a terminal device for uplink transmission, where the first precoding matrix is for generating data to be sent on an antenna port of the terminal device, the first codebook set includes the first precoding matrix, a second precoding matrix, and a third precoding matrix, an element at a first position in the first precoding matrix is equal to a value of exponentiation with a first value as an exponent and a natural constant as a base, an element at a first position in the second precoding matrix is equal to a value of exponentiation with a second value as an exponent and a natural constant as a base, an element at a first position in the third precoding matrix is equal to a value of exponentiation with a third value as an exponent and a natural constant as a base, and the first value, the second value, and the third value are different pure imaginary numbers.

The transceiver unit 1101 is configured to send first precoding indication information to the terminal device, where the first precoding indication information indicates the first precoding matrix in the first codebook set.

In an optional implementation, the transceiver unit 1101 is further configured to send codebook configuration information to the terminal device, where the codebook configuration information is used by the terminal device to determine a phase set including at least one phase value, the phase set is for generating the first codebook set, and any phase value in the phase set corresponds to a precoding matrix in the first codebook set.

In an optional implementation, when a quantity of antenna ports is 4, a precoding matrix in the first codebook set satisfies:

$$V_4^{(1)} = \frac{1}{\sqrt{p \cdot q}} \begin{bmatrix} \begin{bmatrix} 1 \\ B \end{bmatrix} \\ \begin{bmatrix} 1 \\ D \end{bmatrix} \cdot \exp(j\ \varphi) \end{bmatrix}. \quad (24)$$

$v_4^{(1)}$ represents the precoding matrix in the first codebook set, the first codebook set is a codebook set used by the terminal device to transmit one stream, $$B, D \in \{\exp(j\ \theta)\}, \theta = 0 : \frac{2\pi}{N_1} : \frac{(N_1 - 1) \cdot 2\pi}{N_1},$$

$$\varphi = 0 : \frac{2\pi}{N_2} : \frac{(N_2 - 1) \cdot 2\pi}{N_2},$$

p is a quantity of rows of the precoding matrix, q is a quantity of columns of the precoding matrix, and both $N_1$ and $N_2$ are integers greater than 1.

In an optional implementation, the first codebook set is a codebook set corresponding to four antenna ports, the first codebook set is a codebook set determined by the terminal device based on a second codebook set, the second codebook set is a codebook set corresponding to two antenna ports, and any precoding matrix in the second codebook set is a submatrix of at least one precoding matrix in the first codebook set.

In an optional implementation, when a quantity of antenna ports is 8, a precoding matrix in the first codebook set satisfies:

$$V_8^{(1)} = A_1 = \frac{1}{\sqrt{p \cdot q}} \begin{bmatrix} \begin{bmatrix} \begin{bmatrix} 1 \\ B \end{bmatrix} \\ \begin{bmatrix} 1 \\ D \end{bmatrix} \cdot \exp(j\ \varphi) \end{bmatrix} \\ \begin{bmatrix} \begin{bmatrix} 1 \\ E \end{bmatrix} \\ \begin{bmatrix} 1 \\ F \end{bmatrix} \cdot \exp(j\ \varepsilon) \end{bmatrix} \cdot \exp(j\ \delta) \end{bmatrix}. \quad (25)$$

$v_8^{(1)}$ represents the precoding matrix in the first codebook set, the first codebook set is a codebook set used by the terminal device to transmit one stream, $$B, D, E, F \in \{\exp(j\ \theta)\}, \theta = 0 : \frac{2\pi}{N_1} : \frac{(N_1 - 1) \cdot 2\pi}{N_1},$$

$$\varphi = 0 : \frac{2\pi}{N_2} : \frac{(N_2 - 1) \cdot 2\pi}{N_2}, \varepsilon = 0 : \frac{2\pi}{N_3} : \frac{(N_3 - 1) \cdot 2\pi}{N_3},$$

$$\delta = 0 : \frac{2\pi}{N_4} : \frac{(N_4 - 1) \cdot 2\pi}{N_4},$$

p is a quantity of rows of the precoding matrix, q is a quantity of columns of the precoding matrix, and $N_1$, $N_2$, $N_3$, and $N_4$ are all integers greater than 1.

In an optional implementation, the first codebook set is a codebook set corresponding to eight antenna ports, the first codebook set is a codebook set determined by the terminal device based on a third codebook set, the third codebook set is a codebook set corresponding to four antenna ports or a codebook set corresponding to two antenna ports, and any precoding matrix in the third codebook set is a submatrix of at least one precoding matrix in the first codebook set.

In an optional implementation, the codebook configuration information includes a quantized phase value, the quantized phase value is for determining the phase set, and the quantized phase value is positively correlated with precision of the first codebook set.

It should be understood that when the communication apparatus is a network device or a component that implements the foregoing functions in a network device, the processing unit 1102 may be one or more processors, and the transceiver unit 1101 may be a transceiver; or the transceiver unit 1101 may be a sending unit and a receiving unit, the sending unit may be a transmitter, the receiving unit may be a receiver, and the sending unit and the receiving unit are integrated into one component, for example, a transceiver.

When the communication apparatus is a circuit system such as a chip, the processing unit 1102 may be one or more processors, and the transceiver unit 1101 may be an input/output interface, also referred to as a communication interface, an interface circuit, an interface, or the like. Alternatively, the transceiver unit 1101 may be a sending unit and a receiving unit. The sending unit may be an output interface, and the receiving unit may be an input interface. The sending unit and the receiving unit are integrated into one unit, for example, an input/output interface.

The communication apparatus in this embodiment of this application may perform any function performed by the network device in the foregoing method embodiments. For specific steps and/or functions that may be performed, refer to detailed descriptions in the foregoing method embodiments. Only brief descriptions are provided herein, and details are not described again.

Figure 12:
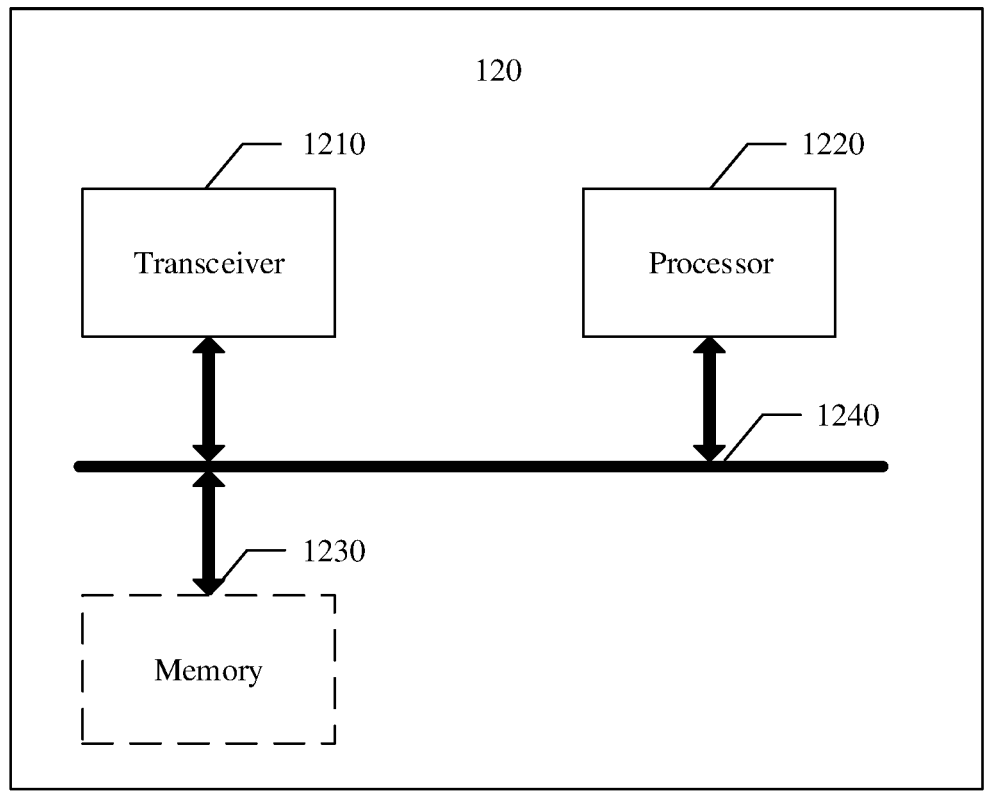
FIG. 12 is a schematic diagram of a structure of a communication apparatus according to an embodiment of this application.

In a possible implementation, the communication apparatus may be the terminal device in the foregoing method embodiments. In this case, the transceiver unit 1101 may be implemented by using a transceiver, and the processing unit 1102 may be implemented by using a processor. As shown in FIG. 12, a communication apparatus 120 includes one or more processors 1220 and one or more transceivers 1210. The processor and the transceiver may be configured to perform a function, an operation, or the like performed by the terminal device.

In a possible implementation, the communication apparatus may be the network device in the foregoing method embodiments. In this case, the transceiver unit 1101 may be implemented by using a transceiver, and the processing unit 1102 may be implemented by using a processor. FIG. 12 is reused. As shown in FIG. 12, the communication apparatus 120 includes one or more processors 1220 and one or more transceivers 1210. The processor and the transceiver may be configured to perform a function, an operation, or the like performed by the network device.

In each implementation of the communication apparatus shown in FIG. 12, the transceiver may include a receiver and a transmitter. The receiver is configured to perform a receiving function (or operation), and the transmitter is configured to perform a transmitting function (or operation). The transceiver is configured to communicate with another device/apparatus through a transmission medium. The processor 1220 receives and sends data and/or signaling by using the transceiver 1210, and is configured to implement corresponding methods in FIG. 5 and FIG. 10 in the foregoing method embodiments.

Optionally, the communication apparatus 120 may further include one or more memories 1230, configured to store program instructions and/or data. The memory 1230 is coupled to the processor 1220. The coupling in this embodiment of this application may be an indirect coupling or a communication connection between apparatuses, units, or modules in an electrical form, a mechanical form, or another form, and is used for information exchange between the apparatuses, the units, or the modules. The processor 1220 may operate in collaboration with the memory 1230. The processor 1220 may execute the program instructions stored in the memory 1230. Optionally, at least one of the one or more memories may be included in the processor.

In this embodiment of this application, a specific connection medium between the transceiver 1210, the processor 1220, and the memory 1230 is not limited. In this embodiment of this application, in FIG. 12, the memory 1230, the processor 1220, and the transceiver 1210 are connected by using a bus 1240, and the bus is represented by using a bold line in FIG. 12. A connection manner between other components is merely used as an example for description, and does not limit the present invention. The bus may be classified into an address bus, a data bus, a control bus, and the like. For ease of representation, only one bold line is used to represent the bus in FIG. 12, but this does not mean that there is only one bus or only one type of bus.

In embodiments of this application, the processor may be a general-purpose processor, a digital signal processor, an application-specific integrated circuit, a field programmable gate array or another programmable logic device, a discrete gate or a transistor logic device, a discrete hardware component, or the like, and may implement or perform the methods, steps, and logical block diagrams disclosed in embodiments of this application. The general-purpose processor may be a microprocessor, any conventional processor, or the like. The steps of the method disclosed with reference to embodiments of this application may be directly performed by a hardware processor, or may be performed by using a combination of hardware in the processor and a software module, or the like.

It may be understood that when the communication apparatus shown in FIG. 12 is a terminal device, the terminal device may further have more components than those in FIG. 12. For example, the terminal device shown in FIG. 12 may further include an antenna. This is not limited in embodiments of this application.

It may be understood that when the communication apparatus shown in FIG. 12 is a network device, the network device may further have more components than those in FIG. 12. This is not limited in embodiments of this application.

It may be understood that the method performed by the processor and the transceiver above is merely an example. For specific steps performed by the processor and the transceiver, refer to the method described above.

Figure 13:
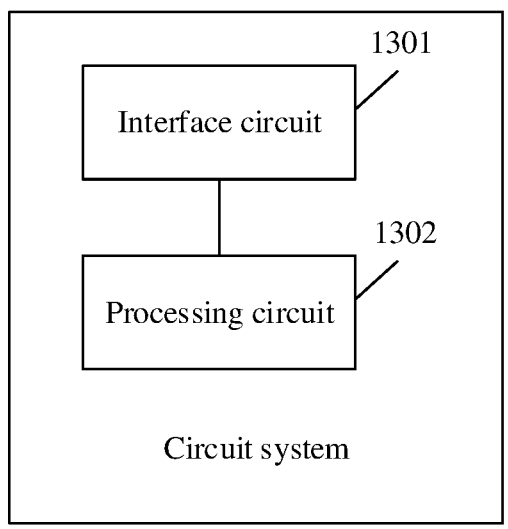
FIG. 13 is a schematic diagram of a structure of a circuit system according to an embodiment of this application.

In another possible implementation, the communication apparatus may be a circuit system in the terminal device. In this case, the processing unit 1102 may be implemented by using a processing circuit, and the transceiver unit 1101 is implemented by using an interface circuit. As shown in FIG. 13, a communication apparatus may include a processing circuit 1302 and an interface circuit 1301. The processing circuit 1302 may be a chip, a logic circuit, an integrated circuit, a processing circuit, a system on chip (system on chip, SoC) chip, or the like. The interface circuit 1301 may be a communication interface, an input/output interface, or the like.

In embodiments of this application, the processing circuit may be a general-purpose processor, a digital signal processor, an application-specific integrated circuit, a field programmable gate array, another programmable logic device, a discrete gate or transistor logic device, a discrete hardware component, or the like, and may implement or perform the methods, steps, and logical block diagrams disclosed in embodiments of this application.

It may be understood that the method performed by the interface circuit and the processing circuit above is merely an example. For specific steps performed by the interface circuit and the processing circuit, refer to the method described above.

In the several embodiments provided in this application, it should be understood that the disclosed system, apparatus, and method may be implemented in other manners. For example, the foregoing apparatus embodiments are only examples. For example, division into the foregoing units is only logical function division, and may be another division manner during actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The foregoing units described as separate parts may or may not be physically separate, and parts displayed as units may or may not be physical units, may be located in one position, or may be distributed on a plurality of network units. Some or all of the units may be selected based on actual requirements to achieve technical effects of the solutions provided in embodiments of this application.

In addition, function units in embodiments of this application may be integrated into one processing unit, each of the units may exist alone physically, or two or more units may be integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, technical solutions of this application essentially, or a part contributing to the current technology, or all or some of the technical solutions may be implemented in a form of a software product. The computer software product is stored in a readable storage medium and includes several instructions for instructing a computer device (which may be a personal computer, a server, a network device, or the like) to perform all or some of the steps of the method in embodiments of this application. The foregoing readable storage medium includes any medium that can store program code, such as a USB flash drive, a removable hard disk, a read-only memory (read-only memory, ROM), a random access memory (random access memory, RAM), a magnetic disk, or an optical disc.

In addition, this application further provides a computer program. The computer program is configured to implement an operation and/or processing performed by the terminal device in the method embodiments provided in this application.

This application further provides a computer-readable storage medium. The computer-readable storage medium stores computer code. When the computer code is run on a computer, the computer is enabled to perform an operation and/or processing performed by the terminal device in the method embodiments provided in this application.

This application further provides a computer program product. The computer program product includes computer code or a computer program. When the computer code or the computer program is run on a computer, an operation and/or processing performed by the terminal device in the method embodiments provided in this application is implemented.

This application further provides a wireless communication system. The wireless communication system includes the network device and the terminal device in embodiments of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A precoding matrix determining method, comprising:
receiving, by a terminal device, first precoding indication information from a network device; and
determining, by the terminal device from a first codebook set, a first precoding matrix indicated by the first precoding indication information, wherein the first precoding matrix is useable for generating data to be sent on an antenna port of the terminal device, wherein
the first codebook set includes the first precoding matrix, a second precoding matrix, and a third precoding matrix, an element at a first position in the first precoding matrix is equal to a value of exponentiation with a first value as an exponent and a natural constant as a base, an element at a first position in the second precoding matrix is equal to a value of exponentiation with a second value as an exponent and a natural constant as a base, an element at a first position in the third precoding matrix is equal to a value of exponentiation with a third value as an exponent and a natural constant as a base, the first value, the second value, and the third value are different pure imaginary numbers, and at least one element in the first precoding matrix is a complex number whose real part and imaginary part are not zero.

2. The method according to claim 1, wherein the method further comprises:
determining, by the terminal device, a phase set based on codebook configuration information, wherein the phase set includes at least one phase value, and the codebook configuration information is information preconfigured by the terminal device or information received from the network device; and
generating, by the terminal device, the first codebook set based on the phase set, wherein any phase value in the phase set corresponds to a precoding matrix in the first codebook set.

3. The method according to claim 1, wherein in response to a quantity of antenna ports of the terminal device is-being 8, the determining, by the terminal device from the first codebook set, the first precoding matrix includes determining the first precoding matrix in the first codebook set that satisfies:

$$V_8^{(1)} = A_1 = \frac{1}{\sqrt{p \cdot q}} \begin{bmatrix} \begin{bmatrix} \begin{bmatrix} 1 \\ B \end{bmatrix} \\ \begin{bmatrix} 1 \\ D \end{bmatrix} \cdot \exp(j\ \varphi) \end{bmatrix} \\ \begin{bmatrix} \begin{bmatrix} 1 \\ E \end{bmatrix} \\ \begin{bmatrix} 1 \\ F \end{bmatrix} \cdot \exp(j\ \varepsilon) \end{bmatrix} \cdot \exp(j\ \delta) \end{bmatrix},$$

wherein
$V_8^{(1)}$ represents a precoding matrix in the first codebook set, $$B, D, E, F \in \{\exp(j\ \theta)\}, \theta = 0 : \frac{2\pi}{N_1} : \frac{(N_1 - 1) \cdot 2\pi}{N_1},$$

-continued $$\varphi = 0 : \frac{2\pi}{N_2} : \frac{(N_2-1)\cdot 2\pi}{N_2}, \varepsilon = 0 : \frac{2\pi}{N_3} : \frac{(N_3-1)\cdot 2\pi}{N_3},$$

$$\delta = 0 : \frac{2\pi}{N_4} : \frac{(N_4-1)\cdot 2\pi}{N_4},$$

p is a quantity of rows of the precoding matrix, q is a quantity of columns of the precoding matrix, and $N_1, N_2, N_3$, and $N_4$ are all integers greater than 1.

4. The method according to claim 1, wherein the determining, by the terminal device from the first codebook set, the first precoding matrix includes determining the first precoding matrix from a codebook set corresponding to eight antenna ports, the first codebook set is a codebook set determined by the terminal device based on a third codebook set, the third codebook set is a codebook set corresponding to four antenna ports or a codebook set corresponding to two antenna ports, and any precoding matrix in the third codebook set is a submatrix of at least one precoding matrix in the first codebook set.

5. The method according to claim 2, wherein the determining, by the terminal device, a phase set based on the codebook configuration information includes determining, by the terminal device, a phase set based on the codebook configuration information that includes a quantized phase value, the quantized phase value is useable for determining the phase set, and the quantized phase value is positively correlated with precision of the first codebook set.

6. A precoding matrix determining method, comprising:
determining, by a network device from a first codebook set, a first precoding matrix to be used by a terminal device for uplink transmission, wherein the first precoding matrix is useable for generating data to be sent on an antenna port of the terminal device, the first codebook set includes the first precoding matrix, a second precoding matrix, and a third precoding matrix, an element at a first position in the first precoding matrix is equal to a value of exponentiation with a first value as an exponent and a natural constant as a base, an element at a first position in the second precoding matrix is equal to a value of exponentiation with a second value as an exponent and a natural constant as a base, an element at a first position in the third precoding matrix is equal to a value of exponentiation with a third value as an exponent and a natural constant as a base, the first value, the second value, and the third value are different pure imaginary numbers, and at least one element in the first precoding matrix is a complex number whose real part and imaginary part are not zero; and
sending, by the network device, first precoding indication information to the terminal device, wherein the first precoding indication information indicates the first precoding matrix in the first codebook set.

7. The method according to claim 6, wherein the method further comprises:
sending, by the network device, codebook configuration information to the terminal device, wherein the codebook configuration information is useable by the terminal device to determine a phase set including at least one phase value, the phase set is usable for generating the first codebook set, and any phase value in the phase set corresponds to a precoding matrix in the first codebook set.

8. The method according to claim 6, wherein in response to a quantity of antenna ports of the terminal device being 8, the determining, by the network device from the first codebook set, the first precoding matrix includes determining the first precoding matrix in the first codebook set that satisfies:

$$V_8^{(1)} = A_1 = \frac{1}{\sqrt{p\cdot q}} \begin{bmatrix} \begin{bmatrix} \begin{bmatrix} 1 \\ B \end{bmatrix} \\ \begin{bmatrix} 1 \\ D \end{bmatrix} \cdot \exp(j\,\varphi) \end{bmatrix} \\ \begin{bmatrix} \begin{bmatrix} 1 \\ E \end{bmatrix} \\ \begin{bmatrix} 1 \\ F \end{bmatrix} \cdot \exp(j\,\varepsilon) \end{bmatrix} \cdot \exp(j\,\delta) \end{bmatrix},$$

wherein
$v_8^{(1)}$ represents a precoding matrix in the first codebook set, $$B, D, E, F \in \{\exp(j\,\theta)\}, \theta = 0 : \frac{2\pi}{N_1} : \frac{(N_1-1)\cdot 2\pi}{N_1},$$

$$\varphi = 0 : \frac{2\pi}{N_2} : \frac{(N_2-1)\cdot 2\pi}{N_2}, \varepsilon = 0 : \frac{2\pi}{N_3} : \frac{(N_3-1)\cdot 2\pi}{N_3},$$

$$\delta = 0 : \frac{2\pi}{N_4} : \frac{(N_4-1)\cdot 2\pi}{N_4},$$

p is a quantity of rows of the precoding matrix, q is a quantity of columns of the precoding matrix, and $N_1, N_2, N_3$, and $N_4$ are all integers greater than 1.

9. The method according to claim 6, wherein the determining, by the network device from the first codebook set, the first precoding matrix includes determining the first precoding matrix from a codebook set corresponding to eight antenna ports, the first codebook set is a codebook set determined by the terminal device based on a third codebook set, the third codebook set is a codebook set corresponding to four antenna ports or a codebook set corresponding to two antenna ports, and any precoding matrix in the third codebook set is a submatrix of at least one precoding matrix in the first codebook set.

10. The method according to claim 7, wherein the determining, by the network device, a phase set based on the codebook configuration information includes determining, by the network device, the phase set based on the codebook configuration information that includes a quantized phase value, the quantized phase value is useable for determining the phase set, and the quantized phase value is positively correlated with precision of the first codebook set.

11. A communication apparatus in a terminal device, comprising:
at least one processor; and
a memory storing programming instructions for execution by the at least one processor, the programming instructions instructing the at least one processor to perform operations including:
receiving first precoding indication information from a network device; and
determining from a first codebook set, a first precoding matrix indicated by the first precoding indication information, wherein the first precoding matrix is useable by the at least one processor for generating data to be sent on an antenna port of the terminal device, wherein
the first codebook set includes the first precoding matrix, a second precoding matrix, and a third precoding matrix, an element at a first position in the first precoding matrix is equal to a value of exponentiation with a first value as an exponent and a natural constant as a base, an element at a first position in the second precoding matrix is equal to a value of exponentiation with a second value as an exponent and a natural constant as a base, an element at a first position in the third precoding matrix is equal to a value of exponentiation with a third value as an exponent and a natural constant as a base, the first value, the second value, and the third value are different pure imaginary numbers, and at least one element in the first precoding matrix is a complex number whose real part and imaginary part are not zero.

12. The apparatus according to claim 11, wherein the at least one processor is further configured to perform operations including:
  determining a phase set based on codebook configuration information, wherein the phase set includes at least one phase value, and the codebook configuration information is information preconfigured by the at least one processor or information received from the network device; and
  generating the first codebook set based on the phase set, wherein any phase value in the phase set corresponds to a precoding matrix in the first codebook set.

13. The apparatus according to claim 11, wherein in response to a quantity of antenna ports of the terminal device being 8, wherein the at least one processor is further configured to determine the first precoding matrix in the first codebook set that satisfies:

$$V_8^{(1)} = A_1 = \frac{1}{\sqrt{p \cdot q}} \begin{bmatrix} \begin{bmatrix} \begin{bmatrix} 1 \\ B \end{bmatrix} \\ \begin{bmatrix} 1 \\ D \end{bmatrix} \cdot \exp(j\,\varphi) \end{bmatrix} \\ \begin{bmatrix} \begin{bmatrix} 1 \\ E \end{bmatrix} \\ \begin{bmatrix} 1 \\ F \end{bmatrix} \cdot \exp(j\,\varepsilon) \end{bmatrix} \cdot \exp(j\,\delta) \end{bmatrix},$$

wherein
$V_8^{(1)}$ represents a precoding matrix in the first codebook set, $B, D, E, F \in \{\exp(j\,\theta)\},\ \theta = 0 : \frac{2\pi}{N_1} : \frac{(N_1-1)\cdot 2\pi}{N_1},$ $\varphi = 0 : \frac{2\pi}{N_2} : \frac{(N_2-1)\cdot 2\pi}{N_2},\ \varepsilon = 0 : \frac{2\pi}{N_3} : \frac{(N_3-1)\cdot 2\pi}{N_3},$ $\delta = 0 : \frac{2\pi}{N_4} : \frac{(N_4-1)\cdot 2\pi}{N_4},$ p is a quantity of rows of the precoding matrix, q is a quantity of columns of the precoding matrix, and $N_1, N_2, N_3,$ and $N_4$ are all integers greater than 1.

14. The apparatus according to claim 11, wherein the first codebook set is a codebook set corresponding to eight antenna ports, the first codebook set is a codebook set determined by the at least one processor based on a third codebook set, the third codebook set is a codebook set corresponding to four antenna ports or a codebook set corresponding to two antenna ports, and any precoding matrix in the third codebook set is a submatrix of at least one precoding matrix in the first codebook set.

15. The apparatus according to claim 12, wherein the codebook configuration information comprises a quantized phase value, the quantized phase value is useable by the at least one processor for determining the phase set, and the quantized phase value is positively correlated with precision of the first codebook set.

16. A communication apparatus in a network device, comprising:
  at least one processor; and
  a memory storing programming instructions for execution by the at least one processor, the programming instructions instructing the at least one processor to perform operations including:
    determining from a first codebook set, a first precoding matrix useable by a terminal device for uplink transmission, wherein the first precoding matrix is useable by the at least one processor for generating data to be sent on an antenna port of the terminal device, the first codebook set includes the first precoding matrix, a second precoding matrix, and a third precoding matrix, an element at a first position in the first precoding matrix is equal to a value of exponentiation with a first value as an exponent and a natural constant as a base, an element at a first position in the second precoding matrix is equal to a value of exponentiation with a second value as an exponent and a natural constant as a base, an element at a first position in the third precoding matrix is equal to a value of exponentiation with a third value as an exponent and a natural constant as a base, the first value, the second value, and the third value are different pure imaginary numbers, and at least one element in the first precoding matrix is a complex number whose real part and imaginary part are not zero; and
    sending first precoding indication information to the terminal device, wherein the first precoding indication information indicates the first precoding matrix in the first codebook set.

17. The apparatus according to claim 16, wherein the at least one processor is further configured to perform operations including:
  sending codebook configuration information to the terminal device, wherein the codebook configuration information is useable by the terminal device to determine a phase set including at least one phase value, the phase set is useable for generating the first codebook set, and any phase value in the phase set corresponds to a precoding matrix in the first codebook set.

18. The apparatus according to claim 16, wherein in response to a quantity of antenna ports of the terminal device being 8, wherein the at least one processor is further configured to determine the first precoding matrix in the first codebook set that satisfies:

$$V_8^{(1)} = A_1 = \frac{1}{\sqrt{p \cdot q}} \begin{bmatrix} \begin{bmatrix} \begin{bmatrix} 1 \\ B \end{bmatrix} \\ \begin{bmatrix} 1 \\ D \end{bmatrix} \cdot \exp(j\,\varphi) \end{bmatrix} \\ \begin{bmatrix} \begin{bmatrix} 1 \\ E \end{bmatrix} \\ \begin{bmatrix} 1 \\ F \end{bmatrix} \cdot \exp(j\,\varepsilon) \end{bmatrix} \cdot \exp(j\,\delta) \end{bmatrix},$$

wherein $v_8^{(1)}$ represents a precoding matrix in the first codebook set, $$B, D, E, F \in \{\exp(j\,\theta)\}, \theta = 0 : \frac{2\pi}{N_1} : \frac{(N_1-1)\cdot 2\pi}{N_1},$$

$$\varphi = 0 : \frac{2\pi}{N_2} : \frac{(N_2-1)\cdot 2\pi}{N_2}, \varepsilon = 0 : \frac{2\pi}{N_3} : \frac{(N_3-1)\cdot 2\pi}{N_3},$$

$$\delta = 0 : \frac{2\pi}{N_4} : \frac{(N_4-1)\cdot 2\pi}{N_4},$$

p is a quantity of rows of the precoding matrix, q is a quantity of columns of the precoding matrix, and $N_1, N_2, N_3$, and $N_4$ are all integers greater than 1.

19. The apparatus according to claim 16, wherein the first codebook set is a codebook set corresponding to eight antenna ports, the first codebook set is a codebook set determined by the at least one processor based on a third codebook set, the third codebook set is a codebook set corresponding to four antenna ports or a codebook set corresponding to two antenna ports, and any precoding matrix in the third codebook set is a submatrix of at least one precoding matrix in the first codebook set.

20. The apparatus according to claim 17, wherein the codebook configuration information includes a quantized phase value, the quantized phase value is useable by the at least one processor for determining the phase set, and the quantized phase value is positively correlated with precision of the first codebook set.

\* \* \* \* \*

UNITED STATES PATENT AND TRADEMARK OFFICE
CERTIFICATE OF CORRECTION

PATENT NO. : 12,170,552 B2
APPLICATION NO. : 18/146519
DATED : December 17, 2024
INVENTOR(S) : Jian Yu It is certified that error appears in the above-identified patent and that said Letters Patent is hereby corrected as shown below:

On the Title Page (1) Item (57) The Abstract should be replaced with:
A precoding matrix determining method and apparatus. A terminal device receives first precoding indication information from a network device; and the terminal device determines, from a first codebook set, a first precoding matrix indicated by the first precoding indication information. The first codebook set includes the first precoding matrix, a second precoding matrix, and a third precoding matrix. An element at a first position in the first precoding matrix is equal to a value of exponentiation with a first value as an exponent and a natural constant as a base.

In the Specification (2) The equation in Column 4, Line 10 should be replaced with the following equation ("B" is mistakenly typed as "8"):

$$B = \exp(j\,\theta), \quad \theta = 0 : \frac{2\pi}{N_1} : \frac{(N_1 - 1) \cdot 2\pi}{N_1}$$

(3) The equation (7) in Column 29, Line 1 should be replaced with the following equation (the last part of the equation is missing):

$$v_4^{(4)} = \frac{1}{\sqrt{p \cdot q}} \cdot \left[ \begin{bmatrix} 1 \\ B \end{bmatrix} \begin{bmatrix} 1 \\ D \end{bmatrix} \cdot \exp(j\,\varphi) \quad \begin{bmatrix} 1 \\ -B \end{bmatrix} \begin{bmatrix} 1 \\ -D \end{bmatrix} \cdot \exp(j\,\varphi) \quad \begin{bmatrix} 1 \\ B \end{bmatrix} -\begin{bmatrix} 1 \\ D \end{bmatrix} \cdot \exp(j\,\varphi) \quad \begin{bmatrix} 1 \\ -B \end{bmatrix} \begin{bmatrix} -1 \\ D \end{bmatrix} \cdot \exp(j\,\varphi) \right]$$

(7).

Signed and Sealed this
First Day of April, 2025

Coke Morgan Stewart
*Acting Director of the United States Patent and Trademark Office*

CERTIFICATE OF CORRECTION (continued)
U.S. Pat. No. 12,170,552 B2

(4) The equation (15) in Column 34, Line 1-24 should be replaced with the following equation (there is a typo in the third part of the equation):

$$V_a^{(4)} = \frac{1}{\sqrt{p \cdot q}} \cdot \left[ \begin{bmatrix} \begin{bmatrix} 1 \\ B \end{bmatrix} \\ \begin{bmatrix} 1 \\ D \end{bmatrix} \cdot \exp(j\varphi) \\ \begin{bmatrix} 1 \\ E \end{bmatrix} \cdot \exp(j\delta) \\ \begin{bmatrix} 1 \\ F \end{bmatrix} \cdot \exp(j\varepsilon) \end{bmatrix} \begin{bmatrix} \begin{bmatrix} 1 \\ B \end{bmatrix} \\ -\begin{bmatrix} 1 \\ D \end{bmatrix} \cdot \exp(j\varphi) \\ \begin{bmatrix} 1 \\ E \end{bmatrix} \cdot \exp(j\delta) \\ -\begin{bmatrix} 1 \\ F \end{bmatrix} \cdot \exp(j\varphi) \end{bmatrix} \begin{bmatrix} \begin{bmatrix} 1 \\ B \end{bmatrix} \\ \begin{bmatrix} 1 \\ D \end{bmatrix} \cdot \exp(j\varphi) \\ -\begin{bmatrix} 1 \\ E \end{bmatrix} \cdot \exp(j\delta) \\ -\begin{bmatrix} 1 \\ F \end{bmatrix} \cdot \exp(j\varepsilon) \end{bmatrix} \begin{bmatrix} \begin{bmatrix} 1 \\ B \end{bmatrix} \\ -\begin{bmatrix} 1 \\ D \end{bmatrix} \cdot \exp(j\varphi) \\ -\begin{bmatrix} 1 \\ E \end{bmatrix} \cdot \exp(j\delta) \\ \begin{bmatrix} 1 \\ F \end{bmatrix} \cdot \exp(j\varphi) \end{bmatrix} \right] \exp(j\delta)$$

(15).

(5) The equation in Column 36, Line 1-10 should be replaced with the following equation (there are two typos in the left portions of the equation):

$$A_6 = \cdot \left[ A_4 \begin{bmatrix} \begin{bmatrix} 1 \\ -B \end{bmatrix} \\ \begin{bmatrix} 1 \\ -D \end{bmatrix} \cdot \exp(j\phi) \\ \begin{bmatrix} 1 \\ -E \end{bmatrix} \cdot \exp(j\delta) \\ \begin{bmatrix} 1 \\ -F \end{bmatrix} \cdot \exp(j\varepsilon) \end{bmatrix} \begin{bmatrix} \begin{bmatrix} 1 \\ -B \end{bmatrix} \\ \begin{bmatrix} 1 \\ -D \end{bmatrix} \cdot \exp(j\phi) \\ \begin{bmatrix} -1 \\ E \end{bmatrix} \cdot \exp(j\delta) \\ \begin{bmatrix} -1 \\ F \end{bmatrix} \cdot \exp(j\varepsilon) \end{bmatrix} \right]$$

(6) The equation (19) in Column 36, Line 35-49 should be replaced with the following equation (there are typos in the right portions of the equation):

$$V_8^{(8)} = \frac{1}{\sqrt{p \cdot q}} \cdot \left[ A_6 \begin{bmatrix} \begin{bmatrix} 1 \\ -B \end{bmatrix} \\ \begin{bmatrix} -1 \\ D \end{bmatrix} \cdot \exp(j\varphi) \\ \begin{bmatrix} 1 \\ -E \end{bmatrix} \cdot \exp(j\delta) \\ \begin{bmatrix} -1 \\ F \end{bmatrix} \cdot \exp(j\varepsilon) \end{bmatrix} \begin{bmatrix} \begin{bmatrix} 1 \\ -B \end{bmatrix} \\ \begin{bmatrix} -1 \\ D \end{bmatrix} \cdot \exp(j\varphi) \\ \begin{bmatrix} -1 \\ E \end{bmatrix} \cdot \exp(j\delta) \\ \begin{bmatrix} 1 \\ -F \end{bmatrix} \cdot \exp(j\varepsilon) \end{bmatrix} \right]$$

(19).